US007685624B2

(12) United States Patent
Oishi

(10) Patent No.: US 7,685,624 B2
(45) Date of Patent: Mar. 23, 2010

(54) RECEIVER UNIT AND METHOD OF SETTING THE SAME

(75) Inventor: Katsumi Oishi, Tokyo (JP)

(73) Assignee: Sony Corporation (JP)

( * ) Notice: Subject to any disclaimer, the term of this patent is extended or adjusted under 35 U.S.C. 154(b) by 635 days.

(21) Appl. No.: 10/544,962

(22) PCT Filed: Feb. 12, 2004

(86) PCT No.: PCT/JP2004/001489

§ 371 (c)(1),
(2), (4) Date: Aug. 8, 2005

(87) PCT Pub. No.: WO2004/075536

PCT Pub. Date: Sep. 2, 2004

(65) Prior Publication Data

US 2006/0156369 A1 Jul. 13, 2006

(30) Foreign Application Priority Data

Feb. 19, 2003 (JP) ............................. 2003-040722

(51) Int. Cl.
*H04N 7/18* (2006.01)
(52) U.S. Cl. ..................... 725/85; 375/260; 725/95
(58) Field of Classification Search .................. 725/22, 725/78, 79, 80, 81, 82, 83, 84, 85, 131, 151
See application file for complete search history.

(56) References Cited

U.S. PATENT DOCUMENTS

| 5,455,823 | A | * | 10/1995 | Noreen et al. | 725/68 |
|---|---|---|---|---|---|
| 5,504,518 | A | * | 4/1996 | Ellis et al. | 725/22 |
| 5,574,964 | A | * | 11/1996 | Hamlin | 725/78 |
| 5,787,335 | A | * | 7/1998 | Novak | 725/78 |
| 6,084,643 | A | * | 7/2000 | Kishtaka et al. | 348/725 |
| 6,134,419 | A | * | 10/2000 | Williams | 725/151 |
| 6,215,530 | B1 | * | 4/2001 | Wasilewski | 725/151 |
| 6,430,742 | B1 | * | 8/2002 | Chanteau | 725/78 |
| 6,687,308 | B1 | * | 2/2004 | Inose et al. | 725/71 |
| 7,137,138 | B2 | * | 11/2006 | Shibata et al. | 725/78 |
| 7,263,713 | B2 | * | 8/2007 | Oishi et al. | 725/131 |
| 2004/0098739 | A1 | * | 5/2004 | Rakib | 725/131 |

FOREIGN PATENT DOCUMENTS

JP 2001-245175 A 9/2001
JP 2001-275011 A 10/2001

* cited by examiner

*Primary Examiner*—Scott Beliveau
*Assistant Examiner*—Jeremy Duffield
(74) *Attorney, Agent, or Firm*—Lerner, David, Littenberg, Krumholz & Mentlik, LLP

(57) ABSTRACT

Satellite receiving channel data 810 are described in a network information table (NIT) in a random fashion. Frequencies in the redelivering facility in a community receiving system are arranged in order of increasing frequencies for each of the networks. In a receiver unit, the frequencies 753 of the satellite receiving channel data 810 are rearranged in order of increasing frequencies and are registered to the receiving frequencies 831 in a frequency conversion table 830. The receiver unit selects the frequency according to wire frequencies 822 of a wire channel 821 in a wire frequency table 820 and registers the wire frequency of a channel that can be normally received to a conversion frequency 832 in the frequency conversion table 830. Therefore, the frequency data contained in the broadcast signals before being redelivered are corresponded to the redelivering frequency of signals really transmitted through a cable on the receiver unit side in the community receiving system.

15 Claims, 21 Drawing Sheets

RECEIVER UNIT AND METHOD OF SETTING THE SAME

TECHNICAL FIELD

This invention relates to a receiver unit and a method of setting the same. More specifically, the invention relates to a receiver unit for receiving broadcast signals redelivered in a community receiving system of a satellite broadcast, to a processing method in the receiver unit, to a computer-readable medium storing a program which so works that a computer executes the above method.

BACKGROUND ART

Apartment houses are using a community receiving system having a community antenna and in which broadcast signals received by the community antenna are redelivered to each household. It is expected that the community receiving system delivers analog signals of a ground wave broadcast in the VHF (very-high frequency) band and in the UHF (ultra-high frequency) band, as well as digital broadcast signals of a broadcast satellite (BS) and a communication satellite (CS).

In redelivering the signals by the community receiving system, the bands of intermediate-frequency signals are overlapped between the BS broadcast and the CS broadcast, making it impossible to transmit the signals through one cable by simply mixing all signals together. If a cable is separately laid to transmit the signals of the CS broadcast, the construction of a large scale is necessary and, besides, an additional device such as a switch for changing over the cables must be attached to the receiver unit of each household. Therefore, there has been proposed a modulation conversion system which converts the system for modulating the signals of CS broadcast, shifts the frequency into an empty channel and transmits the signals through one cable (see, for example, JP-A-2001-245175 (FIG. 1)).

When the modulation conversion system is employed for the community receiving system, however, the channel is converted into a channel of a frequency different from that of the channel used for the broadcast and, hence, the frequency data contained in the broadcast signals become no longer in agreement with the frequency of signals really transmitted through the cable. As an example of digital signals, the transport stream signals of an MPEG (moving picture coding experts group) 2 contain frequency data as control data related to the network, and the receiving operation is carried out based on the frequency data. Therefore, the frequency data in the network information table must be corresponded to the frequency on the cable.

As a technology for automatically rendering the frequency to be corresponded on the receiver unit side, there has been proposed a technology for automatically forming, for example, a conversion table representing a correspondence between the frequency data in the network information table in the ground wave digital broadcast and the frequency on the cable on the receiver unit side (see, for example, JP-A-2001-275011 (FIG. 7)). According to this prior art, it is judged whether the signals can be received while successively setting the frequency in the frequency search mode, and a frequency conversion table is formed by rendering the frequency data of the network information table of when the signals are received to be corresponded to the frequency that has been set.

According to the above prior art, the frequency conversion table is formed by successively setting the frequency, and by rendering the frequency data of the network information table to be corresponded to the frequency that has been set. This is based on a prerequisite in that in the ground wave digital broadcast, the network and the channel (transport stream) have been corresponded in a one-to-one manner, and the network information table that is obtained contains a sole frequency data only.

In the CS broadcast, however, a plurality of transport streams are fed from a satellite (network) while the same network identifier is attached to the transport streams from the same satellite. Therefore, even if the network information table is obtained by setting the frequency, a plurality of frequency data are contained in a random fashion therein, and it is not allowed to readily judge which frequency data is corresponded to the frequency that has been set.

DISCLOSURE OF THE INVENTION

It is an object of this invention to render the frequency data contained in the broadcast signals before being redelivered to be corresponded to the redelivering frequency of signals really transmitted through a cable on the receiver unit side in the community receiving system.

In order to solve the above problem, a receiver unit according to this invention is used in a community receiving system which redelivers broadcast signals from a plurality of networks, and comprises:

a redelivering frequency table for holding a redelivering frequency of broadcast signals that are redelivered;

means for successively selecting the broadcast signals of the redelivering frequency held by the redelivering frequency table for each of the networks;

means for obtaining channel data of a channel included in the network that provides successfully selected broadcast signals among the plurality of networks;

means for rearranging the channel data for each of the networks according to a predetermined order; and means for rendering the rearranged channel data to be corresponded to the redelivering frequency of the successfully selected broadcast signals.

Then, the receiver unit recognizes a relationship between the channel data of a channel in the plurality of networks and the redelivering frequency.

A receiver unit according to the invention, wherein the channel data has a frequency before the redelivery in the network in the channel, and provision is further made of means for forming a frequency conversion table for rendering the frequency before the redelivery of the rearranged channel data to be corresponded to the redelivering frequency of the successfully selected broadcast signals.

Then, the receiver unit recognizes a relationship between the frequency before the redelivery in the plurality of networks and the redelivering frequency.

A receiver unit according to the invention, wherein the channel data further has a service identifier of a service included in the channel.

Then, the receiver unit recognizes a relationship between the service identifier in the plurality of networks and the redelivering frequency.

A receiver unit according to the invention, and further comprises means for displaying the content of the frequency conversion table.

Then, a user recognizes a relationship between the frequency before the redelivery in the plurality of networks and the redelivering frequency.

A receiver unit according to the invention, and further comprises:

means for comparing the number of the frequencies before the redelivery of the channel data with the number of the redelivering frequencies of the successfully selected broadcast signals; and means for promoting the retrial when the number of the frequencies before the redelivery of the channel data is not in agreement with the number of the redelivering frequencies of the successfully selected broadcast signals.

This promotes the retrial upon detecting a defect in the setting of frequencies.

A receiver unit according to the invention, and further comprises:

means for obtaining second channel data having a frequency before the redelivery of the channel included in the plurality of networks after the frequency conversion table has been formed;

means for comparing the number of the frequencies before the redelivery of the second channel data with the number of the redelivering frequencies of the frequency conversion table; and means for promoting the retrial when the number of the frequencies before the redelivery of the second channel data is not in agreement with the number of the redelivering frequencies of the frequency conversion table.

This promotes the retrial upon detecting an increase in the channels.

A receiver unit according to the invention, and further comprises means for displaying the proceeding state of the processing until the frequency conversion table is formed.

Then, the user recognizes the proceeding state of the processing for setting the frequencies.

A method of setting a frequency according to the invention is used for a receiver unit provided with a redelivering frequency table for holding a redelivering frequency of broadcast signals redelivered in a community receiving system that redelivers the broadcast signals from a plurality of networks, and comprises:

a procedure for successively selecting the broadcast signals of the redelivering frequency held by the redelivering frequency table for each of the networks;

a procedure for obtaining channel data of a channel included in the network that provides the successfully selected broadcast signals among the plurality of networks;

a procedure for rearranging the channel data for each of the networks according to a predetermined order; and a procedure for rendering the rearranged channel data to be corresponded to the redelivering frequency of the successfully selected broadcast signals.

Then, the receiver unit recognizes a relationship between the channel data of a channel in the plurality of networks and the redelivering frequency.

A method of setting a frequency according to the invention is used for a receiver unit provided with a redelivering frequency table for holding a redelivering frequency of broadcast signals redelivered in a community receiving system that redelivers the broadcast signals from a plurality of networks, and comprises:

a procedure for successively selecting the broadcast signals of the redelivering frequency held by the redelivering frequency table for each of the networks;

a procedure for obtaining channel data having a frequency before the redelivery of a channel included in the network that provides the successfully selected broadcast signals among the plurality of networks;

a procedure for rearranging the channel data for each of the networks according to a predetermined order; and a procedure for forming a frequency conversion table that renders the frequency before the redelivery of the rearranged channel data to be corresponded to the redelivering frequency of the successfully selected broadcast signals.

Then, the receiver unit recognizes a relationship between the frequency before the redelivery in the plurality of networks and the redelivering frequency.

A method of setting a frequency according to the invention, and further comprises:

a procedure for comparing the number of the frequencies before the redelivery of the channel data with the number of the redelivering frequencies of the successfully selected broadcast signals; and a procedure for promoting the retrial when the number of the frequencies before the redelivery of the channel data is not in agreement with the number of the redelivering frequencies of the successfully selected broadcast signals. This promotes the retrial upon detecting a defect in the setting of frequencies.

A method of setting a frequency according to the invention, and further comprises:

a procedure for obtaining second channel data having a frequency before the redelivery of the channel included in the plurality of networks after the frequency conversion table has been formed;

a procedure for comparing the number of the frequencies before the redelivery of the second channel data with the number of the redelivering frequencies of the frequency conversion table; and a procedure for promoting the retrial when the number of the frequencies before the redelivery of the second channel data is not in agreement with the number of the redelivering frequencies of the frequency conversion table.

This promotes the retrial upon detecting an increase in the channels.

A program according to the invention is used for a receiver unit provided with a redelivering frequency table for holding a redelivering frequency of broadcast signals redelivered in a community receiving system that redelivers the broadcast signals from a plurality of networks, and so works that a computer executes:

a procedure for successively selecting the broadcast signals of the redelivering frequency held by the redelivering frequency table for each of the networks;

a procedure for obtaining channel data of a channel included in the network that provides the successfully selected broadcast signals among the plurality of networks;

a procedure for rearranging the channel data for each of the networks according to a predetermined order; and a procedure for rendering the rearranged channel data to be corresponded to the redelivering frequency of the successfully selected broadcast signals.

Then, the receiver unit recognizes a relationship between the channel data of a channel in the plurality of networks and the redelivering frequency.

A program according to the invention is used for a receiver unit provided with a redelivering frequency table for holding a redelivering frequency of broadcast signals redelivered in a community receiving system that redelivers the broadcast signals from a plurality of networks, and so works that a computer executes:

a procedure for successively selecting the broadcast signals of the redelivering frequency held by the redelivering frequency table for each of the networks;

a procedure for obtaining channel data having a frequency before the redelivery of a channel included in the network that provides the successfully selected broadcast signals among the plurality of networks;

a procedure for rearranging the channel data for each of the networks according to a predetermined order; and a procedure for forming a frequency conversion table that renders the frequency before the redelivery of the rearranged channel data to be corresponded to the redelivering frequency of the successfully selected broadcast signals.

Then, the receiver unit recognizes a relationship between the frequency before the redelivery in the plurality of networks and the redelivering frequency.

A program according to the invention, and so works that a computer executes:

a procedure for comparing the number of the frequencies before the redelivery of the channel data with the number of the redelivering frequencies of the successfully selected broadcast signals; and a procedure for promoting the retrial when the number of the frequencies before the redelivery of the channel data is not in agreement with the number of the redelivering frequencies of the successfully selected broadcast signals.

This promotes the retrial upon detecting a defect in the setting of frequencies.

A program according to the invention, and so works that a computer executes:

a procedure for obtaining second channel data having a frequency before the redelivery of the channel included in the plurality of networks after the frequency conversion table has been formed;

a procedure for comparing the number of the frequencies before the redelivery of the second channel data with the number of the redelivering frequencies of the frequency conversion table; and a procedure for promoting the retrial when the number of the frequencies before the redelivery of the second channel data is not in agreement with the number of the redelivering frequencies of the frequency conversion table.

This promotes the retrial upon detecting an increase in the channels.

A computer-readable recording medium according to the invention stores a program used for a receiver unit provided with a redelivering frequency table for holding a redelivering frequency of broadcast signals redelivered in a community receiving system that redelivers the broadcast signals from a plurality of networks, the program causing a computer to execute:

a procedure for successively selecting the broadcast signals of the redelivering frequency held by the redelivering frequency table for each of the networks;

a procedure for obtaining channel data of a channel included in the network that provides the successfully selected broadcast signals among the plurality of networks;

a procedure for rearranging the channel data for each of the networks according to a predetermined order; and a procedure for rendering the rearranged channel data to be corresponded to the redelivering frequency of the successfully selected broadcast signals.

Then, the receiver unit recognizes a relationship between the channel data of a channel in the plurality of networks and the redelivering frequency.

A computer-readable recording medium according to the invention stores a program used for a receiver unit provided with a redelivering frequency table for holding a redelivering frequency of broadcast signals redelivered in a community receiving system that redelivers the broadcast signals from a plurality of networks, the program causing a computer to execute:

a procedure for successively selecting the broadcast signals of the redelivering frequency held by the redelivering frequency table for each of the networks;

a procedure for obtaining channel data having a frequency before the redelivery of a channel included in the network that provides the successfully selected broadcast signals among the plurality of networks;

a procedure for rearranging the channel data for each of the networks according to a predetermined order; and a procedure for forming a frequency conversion table that renders the frequency before the redelivery of the rearranged channel data to be corresponded to the redelivering frequency of the successfully selected broadcast signals.

Then, the receiver unit recognizes a relationship between the frequency before the redelivery in the plurality of networks and the redelivering frequency.

A computer-readable recording medium according to the invention, and stores a program which causes a computer to execute:

a procedure for comparing the number of the frequencies before the redelivery of the channel data with the number of the redelivering frequencies of the successfully selected broadcast signals; and a procedure for promoting the retrial when the number of the frequencies before the redelivery of the channel data is not in agreement with the number of the redelivering frequencies of the successfully selected broadcast signals.

This promotes the retrial upon detecting a defect in the setting of frequencies.

A computer-readable recording medium according to the invention, and stores a program which causes a computer to execute:

a procedure for obtaining second channel data having a frequency before the redelivery of the channel included in the plurality of networks after the frequency conversion table has been formed;

a procedure for comparing the number of the frequencies before the redelivery of the second channel data with the number of the redelivering frequencies of the frequency conversion table; and a procedure for promoting the retrial when the number of the frequencies before the redelivery of the second channel data is not in agreement with the number of the redelivering frequencies of the frequency conversion table.

This promotes the retrial upon detecting an increase in the channels.

BEST MODE FOR CARRYING OUT THE INVENTION

Figure 1:
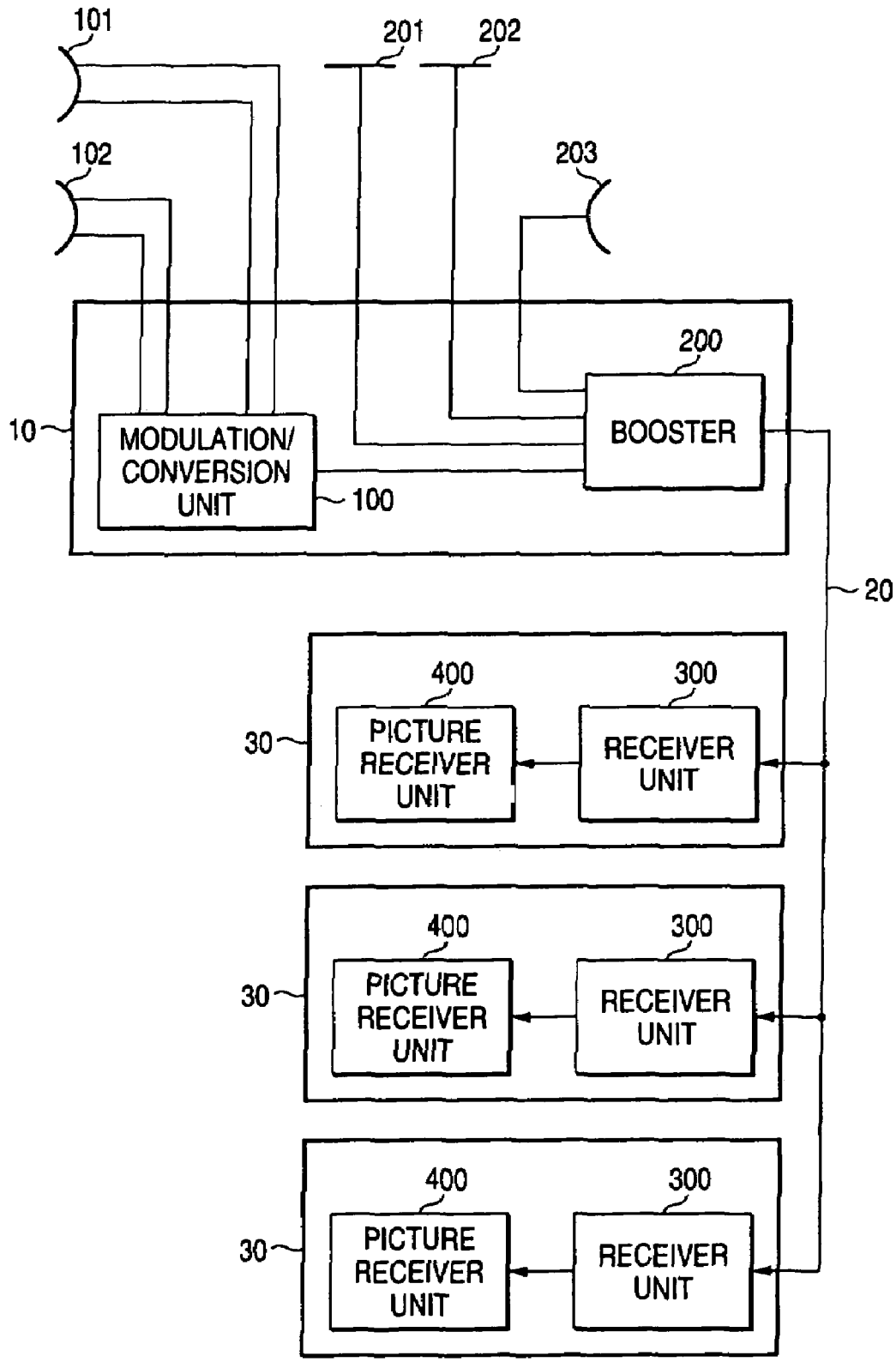
FIG. 1 is a diagram illustrating a community receiving system according to an embodiment of the invention.

FIG. 1 is a diagram illustrating a community receiving system according to an embodiment of the invention. The community receiving system according to the embodiment of the invention includes a community redelivering facility 10 for receiving the broadcast and redelivering the signals to the households, a cable 20 for transmitting the signals redelivered from the community redelivering facility 10 to the households, and receiving facilities 30 in the households. To the community redelivering facility 10 are connected a VHF antenna 201 for receiving VHF broadcast, a UHF antenna 202 for receiving UHF broadcast, a BS antenna 203 for receiving BS broadcast, and CS antennas 101 and 102 for receiving CS broadcast. The community redelivering facility 10 includes a modulation/conversion unit 100 for modulating and converting the signals of CS broadcast, and a booster 200 for mixing the signals together. Further, each receiving facility 30 includes a receiver unit 300 for receiving the redelivered broadcast and a picture receiver unit 400 for producing picture and voice of the broadcast received by the receiver unit 300.

Outputs of the VHF antenna 201 and UHF antenna 202 are fed to the booster 200 in the community redelivering facility 10. The BS antenna 203 has, in the output portion thereof, a low noise block down converter (LNB) through which the received BS signals in a 12 GHz band are converted into an intermediate frequency in a 1 GHz band, and are fed to the booster 200 in the community redelivering facility 10. Likewise, the CS antennas 101 and 102, too, have low noise block down converters in the output portions thereof, through which the received CS signals in the 12 GHz band are converted into an intermediate frequency in the 1 GHz band, and are fed to the modulation/conversion unit 100 in the community redelivering facility 10.

The CS broadcast utilizes electromagnetic waves in the 12 GHz band from a communication satellite. Two CS antennas 101 and 102 are provided to cope with a possible broadcast service using two communication satellites like SkyPerfect TV. The signals from the communication satellite include vertically polarized signals and horizontally polarized signals. Being corresponded thereto, the CS antennas 101 and 102 are provided with vertically polarized signal output terminals and horizontally polarized signal output terminals. The modulation/conversion unit 100 converts the modulation system for the vertically polarized signals and horizontally polarized signals of the communication satellites, and shifts them into a frequency in the cable 20. The output of the modulation/conversion unit 100 is fed to the booster 200. The booster 200 mixes the output of the modulation/conversion unit 100 together with the outputs from other antennas 201 to 203, and outputs them onto the cable 20.

The receiver unit 300 receives signals from the cable 20 to pick up the content of broadcast. The picture data and voice data are, then, output to the picture receiver unit 400. The picture receiver unit 400 outputs the picture and voice in compliance with picture data and voice data from the receiver unit 300. The receiver unit 300 and the picture receiver unit 400 may be constituted as a TV receiver of an integrated form to receive digital broadcast, or may be constituted as separate and independent set-top box and TV receiver.

Figure 2:
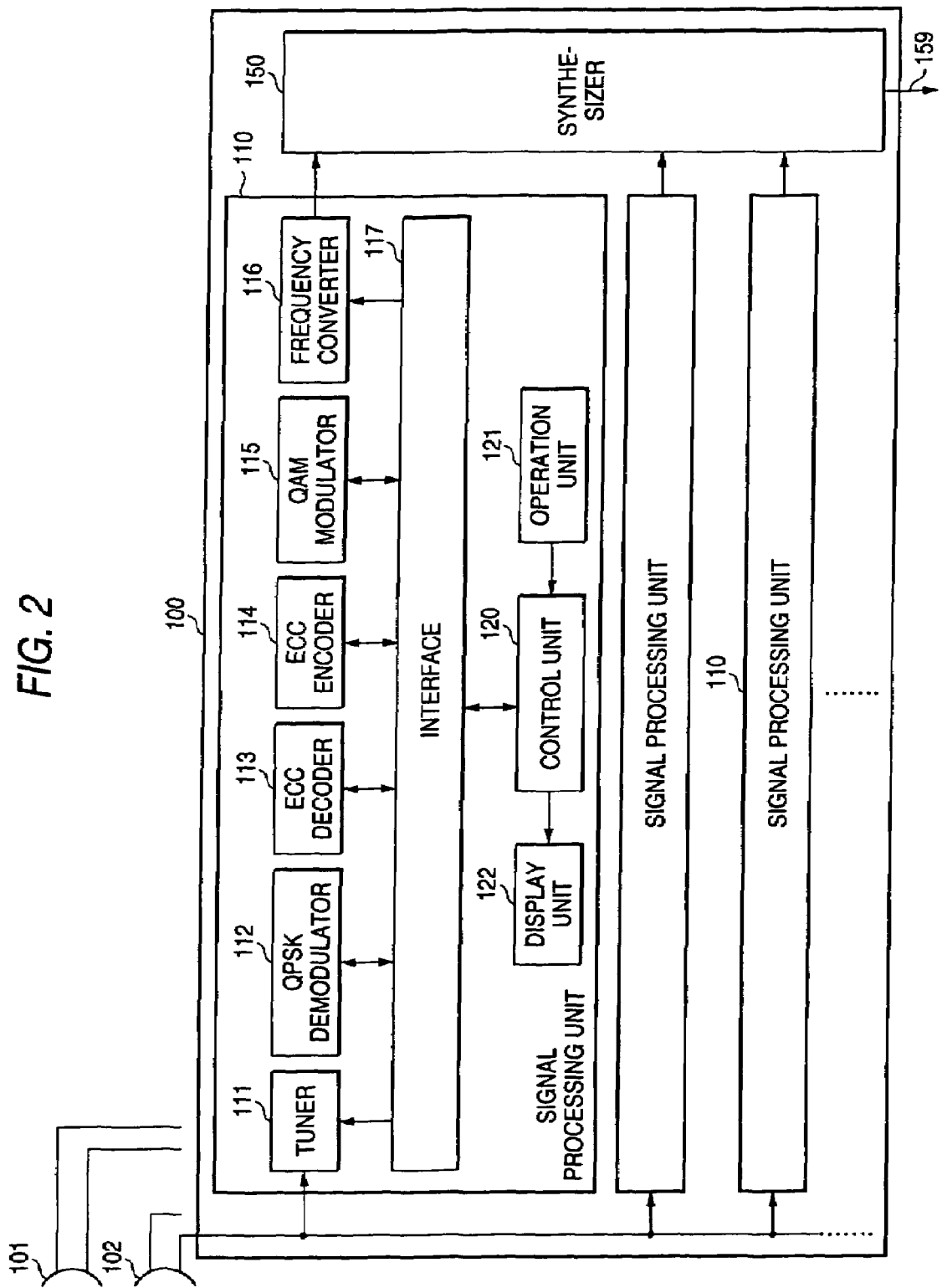
FIG. 2 is a diagram illustrating a constitution of a modulation/conversion unit 100 in a community redelivering facility 10 according to the embodiment of the invention.

FIG. 2 is a diagram illustrating a constitution of the modulation/conversion unit 100 in the community redelivering facility 10 according to the embodiment of the invention. The modulation/conversion unit 100 includes signal processing units 110 provided for each of the channels (transport streams) of CS broadcast, and a synthesizer 150 for synthesizing the outputs of the signal processing units 110. The signal processing units 110 are connected to either the vertically polarized signal output terminal or the horizontally polarized signal output terminal of the CS antenna 101 or 102, and shift the frequency after having converted the system for modulating the intermediate-frequency signals of a predetermined channel of CS broadcast from the QPSK into the 64-value QAM.

In the QPSK (quadrature phase shift keying), the modulation is effected by using 4-phase carrier waves having phases different by 90 degrees from one another. In the 64-value QAM (quadrature amplitude modulation), on the other hand, the modulation is effected by taking 64 values at places where signal points are distant from each other. The QAM is capable of transmitting large amounts of data while narrowing the transmission band width as compared to that of the QPSK. By converting the QPSK to the 64-value QAM, therefore, the band can be narrowed; e.g., the signals (transport streams) of one transponder of CS broadcast of, for example, a 27-MHz bandwidth can be transmitted being allocated to one channel of a ground wave broadcast of, for example, a 6-MHz band width.

The signal processing unit 110 includes a tuner 111, a QPSK demodulator 112, an ECC decoder 113, an ECC encoder 114, a QAM modulator 115, a frequency converter 116, an interface 117, a control unit 120, an operation unit 121 and a display unit 122. The tuner 111 is supplied with either the vertically polarized signal output terminal or the horizontally polarized signal output terminal of the CS antenna 101 or 102. The tuner 111 selects intermediate-frequency signals of a predetermined channel of CS broadcast. The output of the tuber 111 is fed to the QPSK demodulator 112. The QPSK demodulator 112 demodulates the QPSK-modulated signals from the tuner 111.

The output of the QPSK demodulator 112 is fed to the ECC decoder 113, and the output of the ECC decoder 113 is fed to the ECC encoder 114. These ECC decoder 113 and ECC encoder 114 add again error correction codes; i.e., the ECC decoder 113 decodes the ECC by using a Reed-Solomon code and a convolutional code and, then, the ECC encoder 114 encodes the ECC by using the Reed-Solomon code. In the CS broadcast, the Reed-Solomon code and the convolutional code are used as error correction codes. This is because no convolutional code is used for the transmission on the cable.

The output of the ECC encoder 114 is fed to the QAM modulator 115. The QAM modulator 115 executes the 64-value QAM modulation. The output of the QAM modulator 115 is fed to the frequency converter 116. The frequency converter 116 converts the output signals of the QAM modulator 115 into a frequency corresponding to an empty channel. The output of the frequency converter 116 is fed to the synthesizer 150.

The processing in the tuner 111, QPSK demodulator 112, ECC decoder 113, ECC encoder 114, QAM modulator 115 and frequency converter 116 is controlled by the control unit 120 through the interface 117. The operation unit 121 sets the input to the control unit 120. The display unit 122 displays a state that is set or the like.

The system for modulating the intermediate-frequency signals of CS broadcast is converted from the QPSK into the 64-value QAM in each signal processing units 110 and, then, the signals are shifted for their frequency. The signals are then synthesized through the synthesizer 150 and are transmitted to each household by the cable 20 through a signal line 159.

Figure 3:
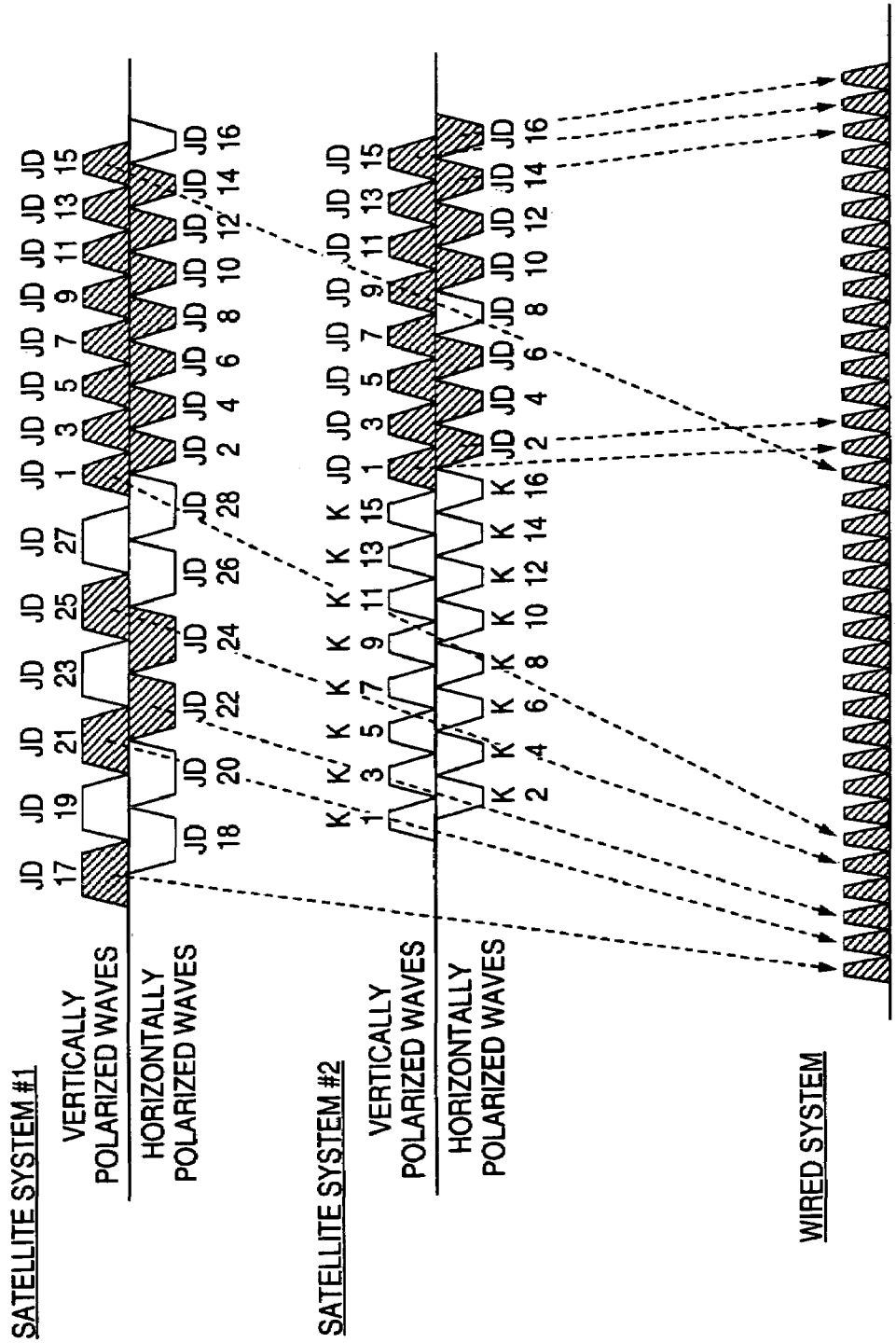
FIG. 3 is a diagram illustrating an arrangement of frequencies according to the embodiment of the invention.

FIG. 3 is a diagram illustrating an arrangement of frequencies according to the embodiment of the invention. FIG. 3 imagines a broadcast service using two communication satellites (satellite system #1 and satellite system #2). The signals of each communication satellite can be divided into vertically polarized signals and horizontally polarized signals. Broadcasting channels from JD17 to JD28 and from JD1 to JD16 are allocated to each communication satellite in order of increasing frequency. Odd numbers are attached to the vertically polarized signals and even numbers are attached to the horizontally polarized signals. For the use of communications, the channel names of K1 to K28 are used in order of increasing frequency. In FIG. 3, the former half of the satellite system #2 is preserved for the communication use.

The signals of the communication satellite are QPSK-modified in the 12 GHz band and are transmitted. In the broadcasting channels JD17 to JD28, the frequency pitch is 40 MHz and in the broadcasting channels JD1 to JD16, the frequency pitch is 30 MHz. In each channel, the signal band width is 27 MHz. The signals of the communication satellites are converted into an intermediate frequency in the 1 GHz band by the low noise block down converter in the antenna.

In the embodiment of the invention, the QPSK-modified signals are converted into 64-QAM. Then, the signals of a band width of 27 MHz of the satellite system are converted into wire-system signals of a band width of 6 MHz on the cable 20. Further, the frequency is shifted from the intermediate frequency of the 1 GHz band into an empty channel of the wired system. The arrangement of frequencies in the wired system is allocated in order of increasing frequency from the side of a smaller frequency of the wired system, and complies with the following two rules.

First, the signals of a plurality of networks are not arranged in a mixed manner. The networks referred to here stand for satellites. The networks may be in any order. Namely, in FIG. 3, the signals are arranged starting with the satellite system #1. However, the signals may be arranged starting with the satellite system #2.

Second, the channels in the networks are arranged in order of increasing frequency of the satellite systems. In FIG. 3, for example, the frequency of the channel JD25 is lower than the frequency of the channel JD1. When arranged in order of increasing frequency, therefore, JD25 is arranged earlier. In the wired system, too, a lower frequency is allocated to the JD25. Here, however, the allocation of channels in the wired system needs not be of continuous frequencies but may be of discrete frequencies.

In FIG. 3, the satellite system #1 is arranged, first, and, then, the satellite system #2 is arranged (first rule). Then, the channels are selected for the satellites in order of increasing frequencies and are arranged on the channels of the wired system (second rule). In FIG. 3, the shaded signals are representing the channels used for the broadcast. Therefore, other channels are not targeted for rearrangement.

In the frequency arrangement of the wired system, the VHF and UHF ground wave broadcasts use a VHF low band (90 MHz to 108 MHz), a VHF high band (170 MHz to 222 MHz), and a UHF band (470 MHz to 770 MHz). That is, there have been used neither a mid band (108 MHz to 170 MHz) between the VHF low band and the VHF high band nor a super high band (222 MHz to 470 MHz) between the VHF high band and the UHF band. Therefore, it can be contrived to use the mid band and the super high band as wired-system frequencies of the CS broadcast. The mid band can be secured over a range of about 60 MHz and the super high band can be secured over a range of about 246 MHz. Therefore, if simply calculated, 51 channels of transmission can be accomplished. Even in the above VHF and UHF bands, partly empty channels can be used if there exist any such channels. In particular, in the UHF band, in many cases, there exist only several ground wave stations, and it is considered that there can be used many channels.

As described above, the channels of the wired system are arranged in order of frequency of the satellite system for each of the networks (satellites) according to the above rules.

Figure 4:
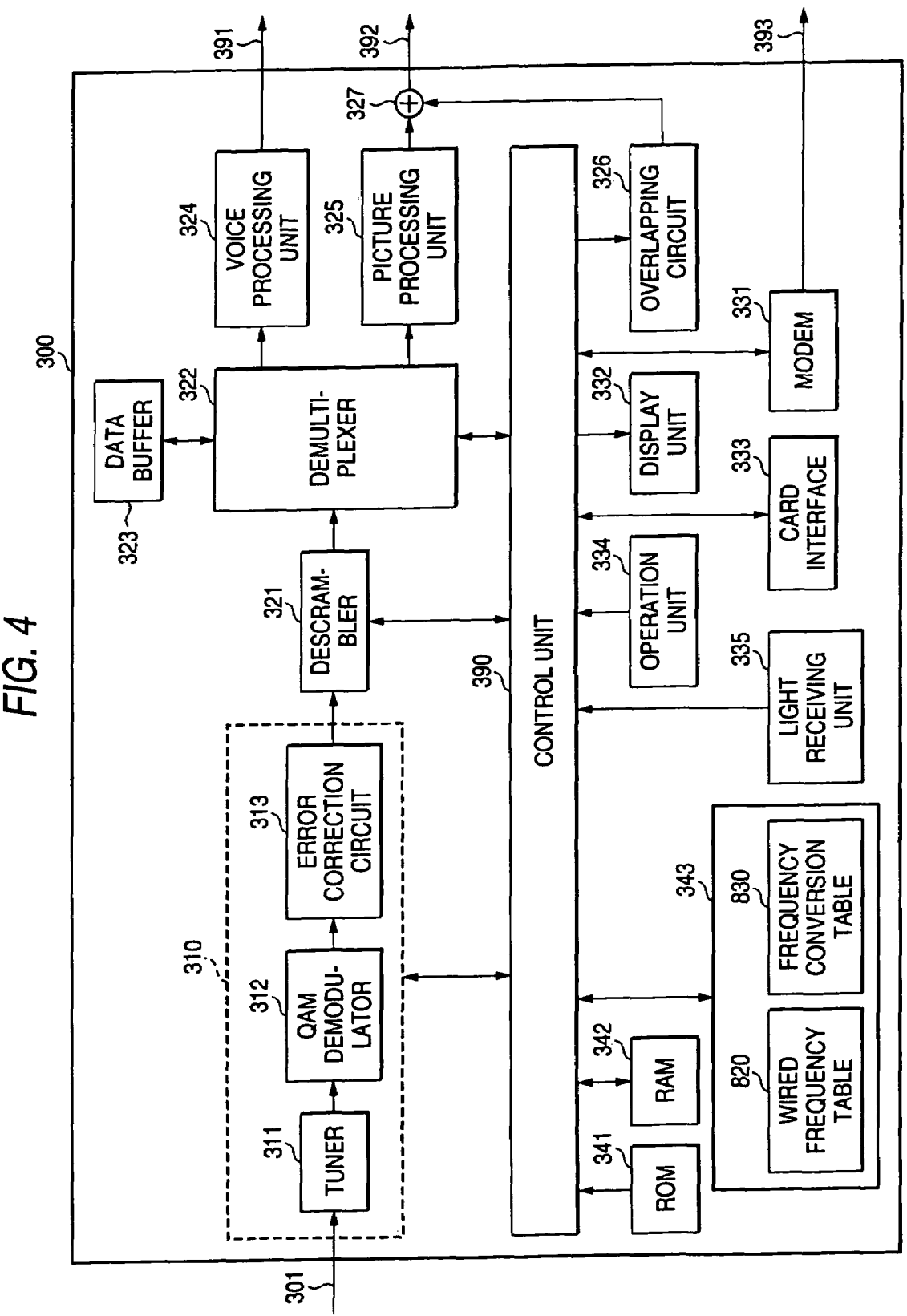
FIG. 4 is a diagram illustrating the constitution of a receiver unit 300 according to the embodiment of the invention.

FIG. 4 is a diagram illustrating the constitution of the receiver unit 300 according to the embodiment of the invention. In FIG. 4, signals of the input signal line 301 drawn from the cable 20 (FIG. 1) are fed to a front end unit 310. The front end unit 310 includes a tuner 311, a QAM demodulator 312 and an error correction circuit 313. The signals from the input signal line 301 are fed to the tuner 311 in the front end unit 310. The tuner 311 selects signals of a desired frequency out of the signals transmitted through the cable 20. The output of the tuner 311 is fed to the QAM demodulator 312. The QAM demodulator 312 executes the QAM demodulation processing. The output of the QAM demodulator 312 is fed to the error correction circuit 313. The error correction circuit 313 works as an ECC decoder and executes an error correction processing by using Reed-Solomon codes.

The output of the error correction circuit 313 is fed to a descrambler 321. To the descrambler 321 is fed, through a control unit 390, a key data for descrambling stored in an IC card mounted on a card interface 333. By using the key data of the IC card, the descrambler 321 descrambles the MPEG transport stream. The descrambled transport stream of the MPEG 2 is sent to a demultiplexer 322.

Being controlled by the control unit 390, the demultiplexer 322 separates a desired packet out of the stream from the descrambler 321 by using the data buffer 323. The transmission packet has a packet identifier (PID) described in the header portion. Based upon the PID, the demultiplexer 322 picks up the picture packet and voice packet of a desired program as well as the data related to the program. The picture packet of the desired program is sent to a picture processing unit 325, and the voice packet is sent to a voice processing unit 324. Data related to the program specifications are sent to the control unit 390.

The picture processing unit 325 receives a packet of picture signals from the demultiplexer 322, and executes the decoding processing of the MPEG 2 system to form video signals. The video signals are fed to an adder circuit 327. To the adder circuit 327 are fed on-screen display signals from an overlapping (OSD: on screen display) circuit 326. The on-screen display signals are generated based upon the signals from the control unit 390. The output of the adder circuit 327 is produced through a video output signal line 392.

The voice processing unit 324 receives a voice packet from the demultiplexer 322, and executes a voice decoding processing of the MPEG system to form audio signals. The output of the voice processing unit 324 is obtained through a voice output signal line 391.

Signals are input through an operation unit 334 to operate the receiver unit 300. The operation unit 334 is, for example, a keyboard and its output is fed to the control unit 390. Further, an infrared ray signals from a remote controller (not shown) are received by a light receiving unit 335 and are fed to the control unit 390. The output of the control unit 390 is fed to a display unit 332, which displays various set states. The control unit 390 is connected to a telephone circuit 393 through a modem 331.

To the control unit 390 is further connected a nonvolatile memory 343 in addition to a ROM (read only memory) 341 and a RAM (random access memory) 342. The ROM 341 holds a program and the like executed by the control unit 390. The RAM 342 maintains an operation region necessary for the processing in the control unit 390. The nonvolatile memory 343 has a function to continuously hold the stored content even after the power supply to the receiver unit 300 is interrupted and is, for example, an EEPROM (electrically erasable and programmable read only memory) or the like. The nonvolatile memory 343 holds a wire frequency table 820 and a frequency conversion table 830 that will be described later.

Next, described below with reference to the drawings are broadcast signals according to the embodiment of the invention.

Figure 5:
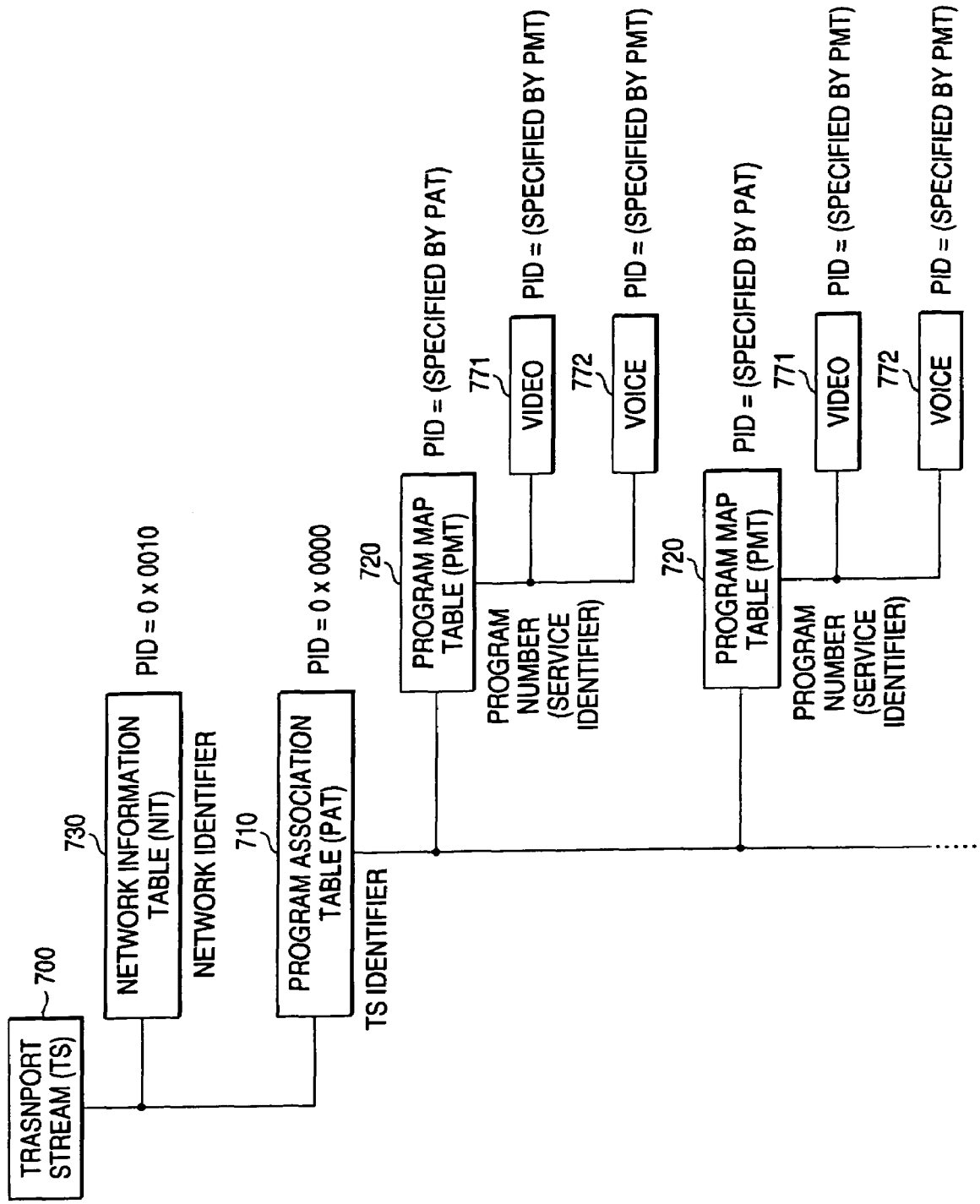
FIG. 5 is a diagram illustrating the data structure in a transport stream 700 in the MPEG 2.

FIG. 5 is a diagram illustrating a data structure in the transport stream 700 of MPEG 2 used in the CS broadcast. Signals delivered by the transport stream include video data 771, voice data 772 as well as a control table for specifying a relation thereof to a program. The control table is called program specific information (PSI). Examples of the program specific information (PSI) include a program association table (PAT) 710, a program map table (PMT) 720 and a network information table (NIT) 730.

The program association table (PAT) 710 is provided for each transport stream 700 and shows which program is included in the transport stream 700. The program map table (PMT) 720 is provided for each program and designates a packet identifier (PID) for identifying video data 771 and voice data 772 included in the program and a method of decoding thereof. The packet identifier (PID) of the program map table (PMT) 720 is designated by the program association table (PAT) 710. The network information table (NIT) 730 shows the kinds of services in the network that includes the transport stream 700 being received and in other networks. In the transport stream 700 of MPEG 2, the program and the services are synonymous to each other.

Figure 6:
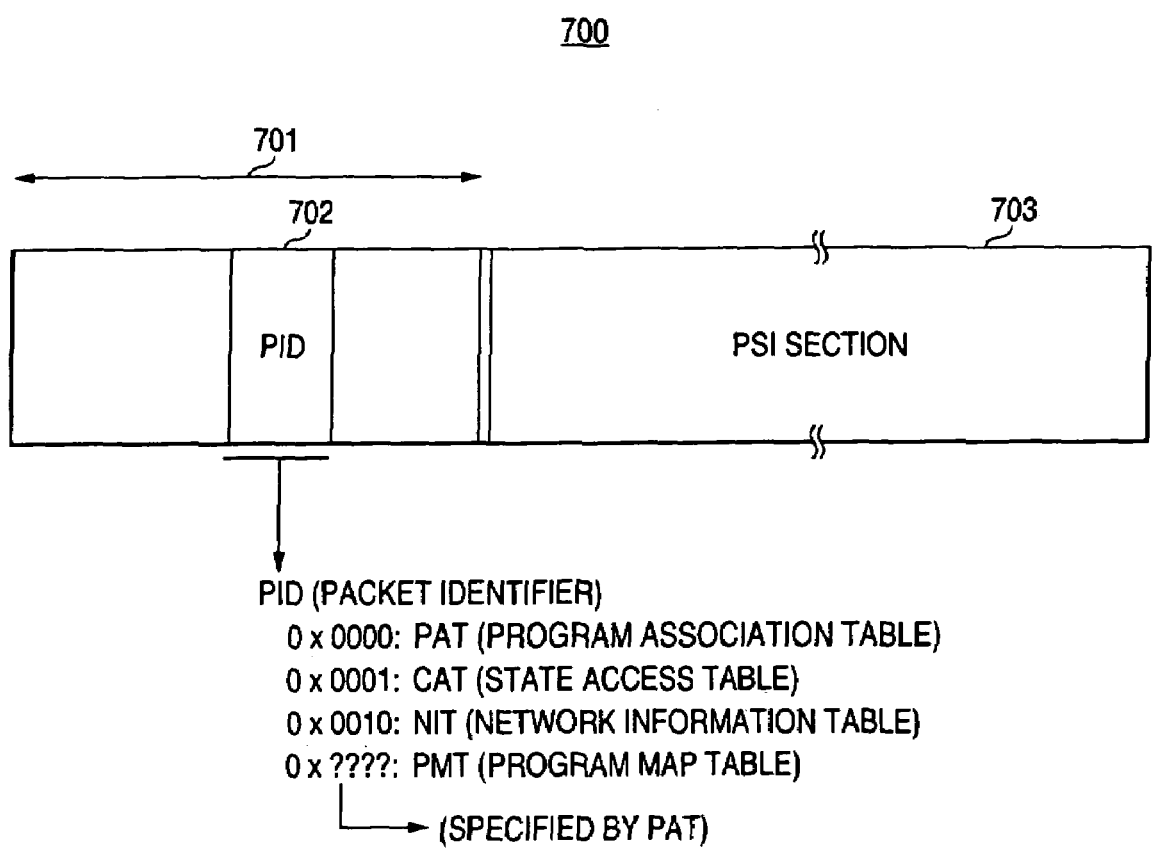
FIG. 6 is a diagram illustrating the packet constitution in the transport stream 700.

FIG. 6 is a diagram illustrating a packet constitution of the transport stream 700. The transport stream packet is constituted by a packet header 701 and a payload. The packet header 701 includes a synchronizing byte, an error indication bit as well as a packet identifier (PID) 702. The packet identifier (PID) 702 is for identifying the transport stream packet and is "0x0000" ("0x" represents the hexadecimal notation) in the case of the program association table (PAT) 710, and is "0x0010" in the case of the network information table (NIT) 730. The packet identifier (PID) 702 of the program map table (PMT) 720 is designated by the program association table (PAT) 710 as will be described later.

When the packet identifier (PID) 702 is indicating these tables, a PSI section 703 is held by the payload. A table represented by the packet identifier (PID) 702 is held as the content of the PSI section 703.

Figure 7:
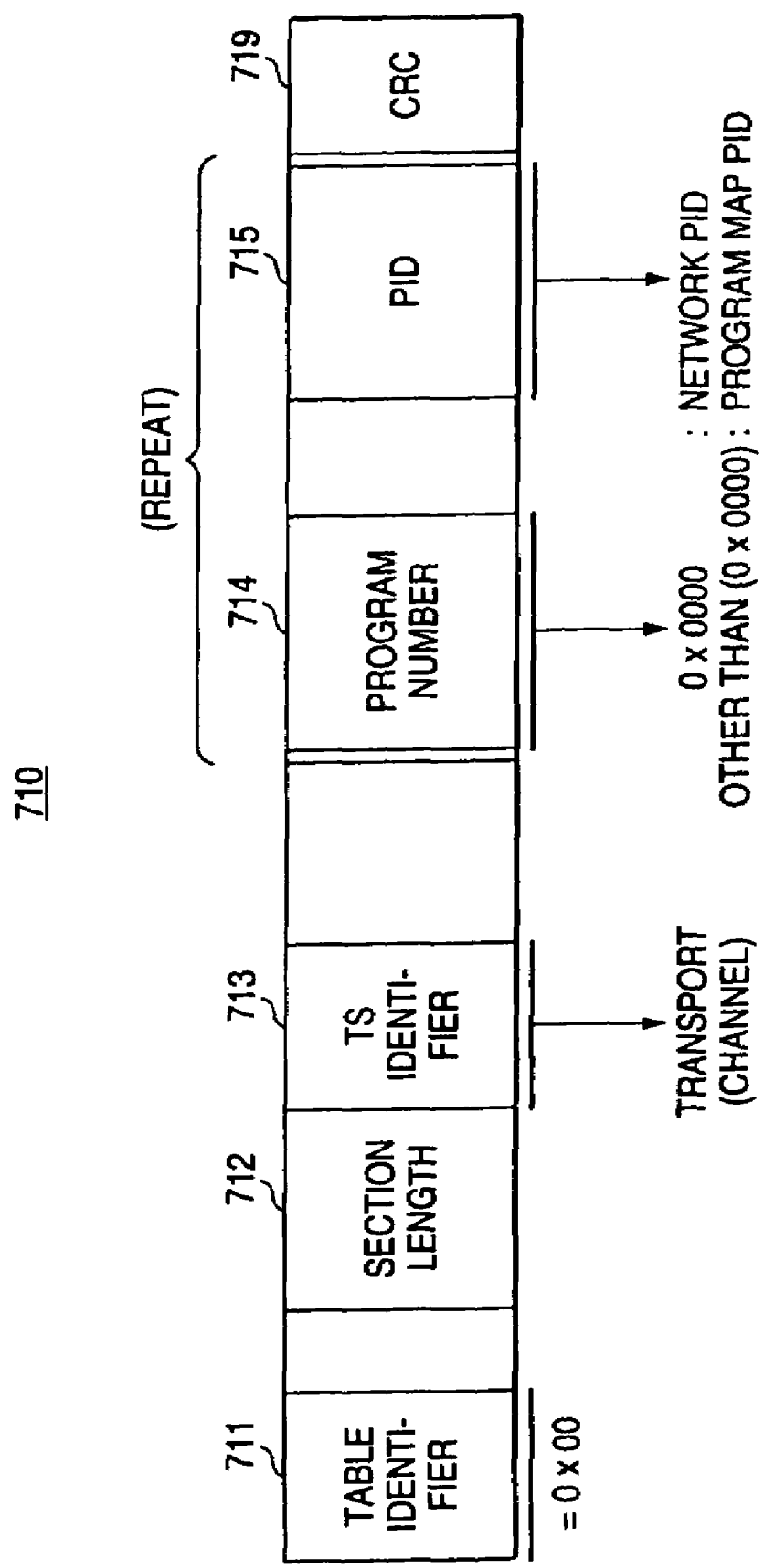
FIG. 7 is a diagram illustrating the constitution of a program association table (PAT) 710.

FIG. 7 is a diagram illustrating the constitution of the program association table (PAT) 710. In the case of the program association table (PAT) 710, the table identifier 711 represents "0x00". The section length 712 represents a byte length of from right after it up to the end of the program association table (PAT) 710. A TS identifier 713 is for identifying the transport stream and corresponds to the transponder in the case of a satellite.

A pair of a program No. 714 and a PID 715 in the repeating portion represents a program included in the transport stream identified by the TS identifier 713. The program No. 714 is for identifying the program (service). The PID 715 represents the packet identifier (PID) of the program map table (PMT) 720 corresponding to the program No. 714. When the program No. 714 is "0x0000", however, the PID 715 represents a packet identifier (PID) of the network information table (NIT) 730. A CRC (cyclic redundancy check) 719 is an error detection code, and is so selected that the output becomes zero after the section (PAT 710 in this case) as a whole is processed.

Figure 8:
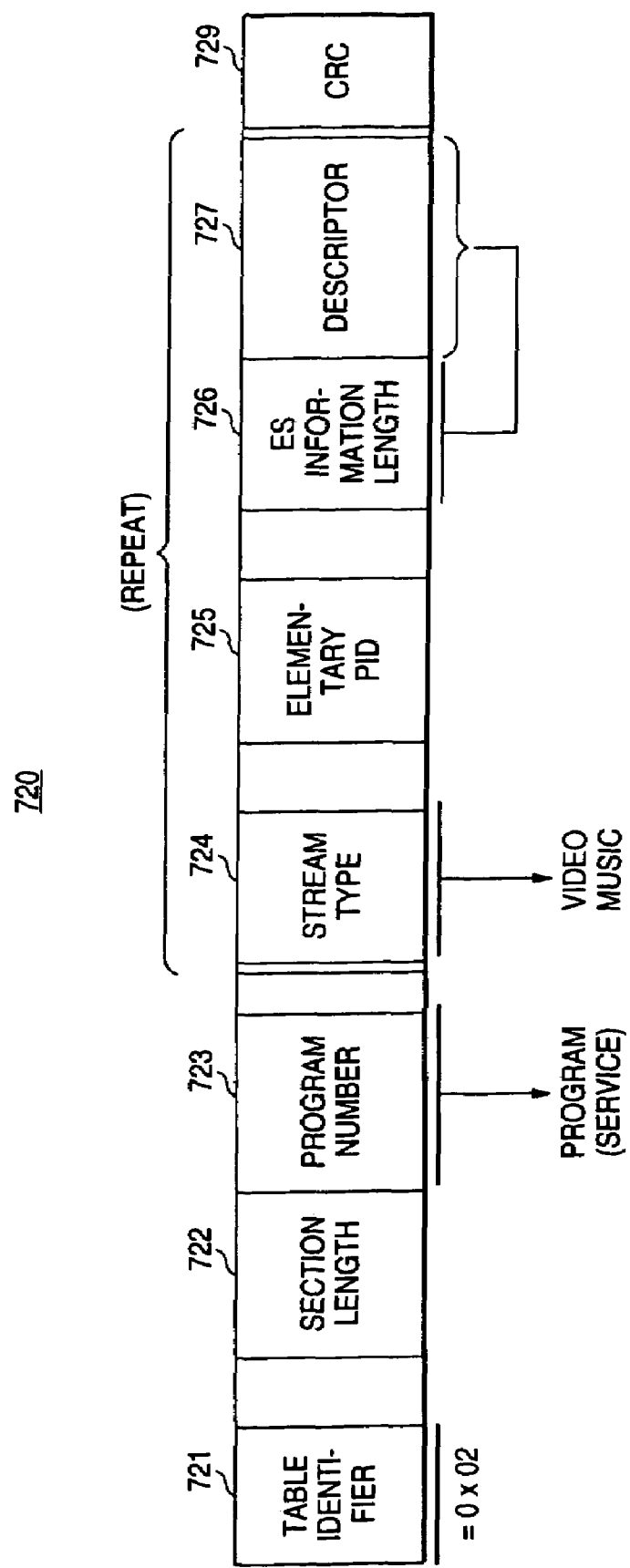
FIG. 8 is a diagram illustrating the constitution of a program map table (PMT) 720.

FIG. 8 is a diagram illustrating the constitution of the program map table (PMT) 720. In the case of the program map table (PMT) 720, the table identifier 721 represents "0x02". Like the section length 712, a section length 722 represents a byte length of from right after it to the end of the program map table (PMT) 720. Like the program No. 714, a program No. 723 is for identifying the program (service).

The repeating portion describes the content of the program identified by the program No. 723. A stream type 724 represents the kind of the signals that are transmitted, such as video signals and voice signals. An elementary PID 725 represents a packet identifier (PID) of the elementary stream. An ES information length 726 represents the length of a descriptor 727 right after it. The descriptor 727 describes the data of the elementary stream. Further, a CRC 729 following the repeating portion holds an error detection code like the CRC 719.

Thus, a double indirect designation system is employed for designating a program map table (PMT) 720 by the program association table (PAT) 710 and for designating the video data 771 and the voice data 772 by the program map table (PMT) 720.

Figure 9:
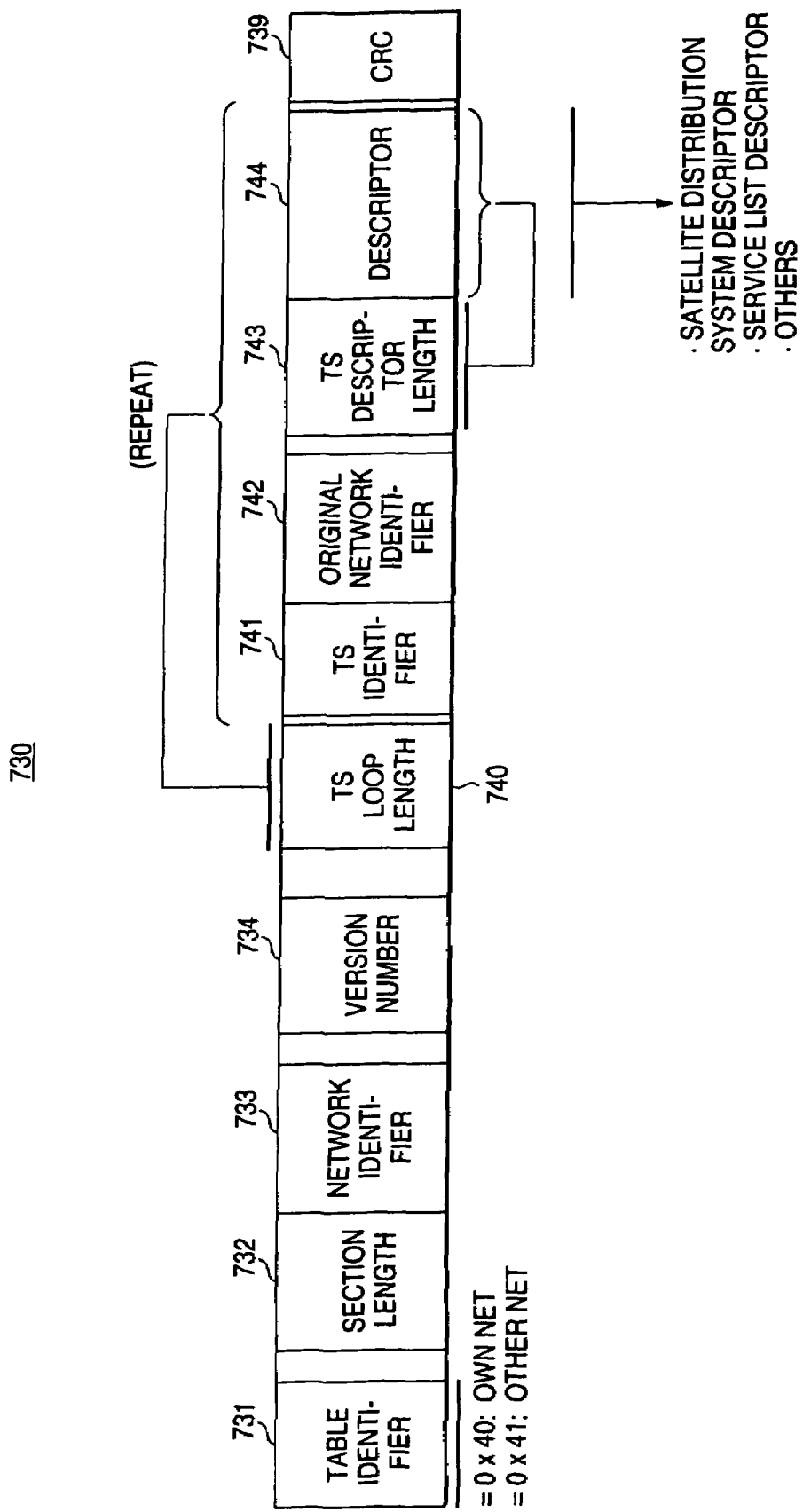
FIG. 9 is a diagram illustrating the constitution of a network information table (NIT) 730.

FIG. 9 is a diagram illustrating the constitution of the network information table (NIT) 730. In the network information table (NIT) 730, a table identifier 731 represents "0x40" in the case of the data related to the network (own network) including the transport stream 700 that is received, and represents "0x41" in the case of the data related to other networks. Like the section length 712, a section length 732 represents a byte length of from right after it to the end of the network information table (NIT) 730. A network identifier 733 is for identifying the network and represents "0x0001" in the case of, for example, one satellite (JCSAT-No. 3) of SkyPerfect TV and represents "0x0003" in the case of the other satellite (JCSAT-No. 4). A version No. 734 is that of data included in the network information table (NIT) 730.

A TS loop length 740 represents a byte number of the repeating portion right after it. In the repeating portion, there is described data related to the transport stream for each transport stream. Like the TS identifier 713 in the program association table (PAT) 710, the TS identifier 741 identifies the transport stream. An original network identifier 742 represents a network identifier of the original delivery system, and assumes the same value as the network identifier 733 when the network information table (NIT) 730 is transmitted on the network in which the transport stream is generated.

A TS descriptor length 743 represents the number of the whole bytes of the descriptor 744 right after it. The descriptor 744 describes data related to the network. Examples of the descriptor 744 include a descriptor related to the delivery system of the network and a descriptor related to a service (program) that is offered. Like the CRC 719, further, a CRC 739 following the repeating portion holds an error detection code.

Figure 10:
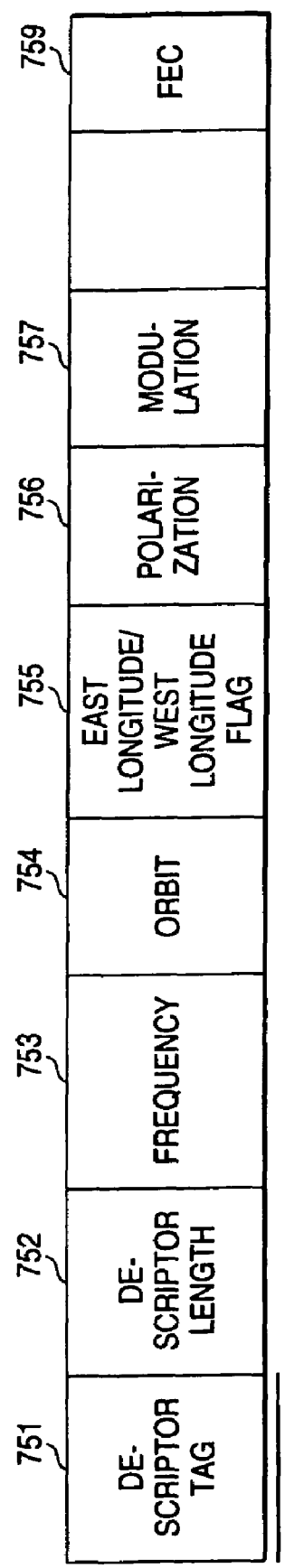
FIG. 10 is a diagram illustrating the constitution of a satellite delivery system descriptor 750.

FIG. 10 is a diagram illustrating the constitution of a satellite delivery system descriptor 750 included in the descriptor 744 of the network information table (NIT) 730. In the satellite delivery system descriptor 750, the descriptor tag 751 represents "0x43". A descriptor length 752 represents the data length of the descriptor. A frequency 753 is a transmission frequency of the transport stream identified by the TS identifier 741 of the network information table (NIT) 730. An orbit 754 represents a longitude of an orbital position of the satellite.

An east longitude/west longitude flag 755 represents whether the orbital position of the satellite is on the east longitude or on the west longitude. A polarization 756 represents whether the signals being transmitted are horizontally polarized, vertically polarized, levo-rotary polarized or dextro-rotary polarized. A modulation 757 represents the modulation system, and is "0x01" representing QPSK modulation in the case of the CS broadcast. An FEC (forward error correction) 759 represents a coding factor of internal codes.

Figure 11:
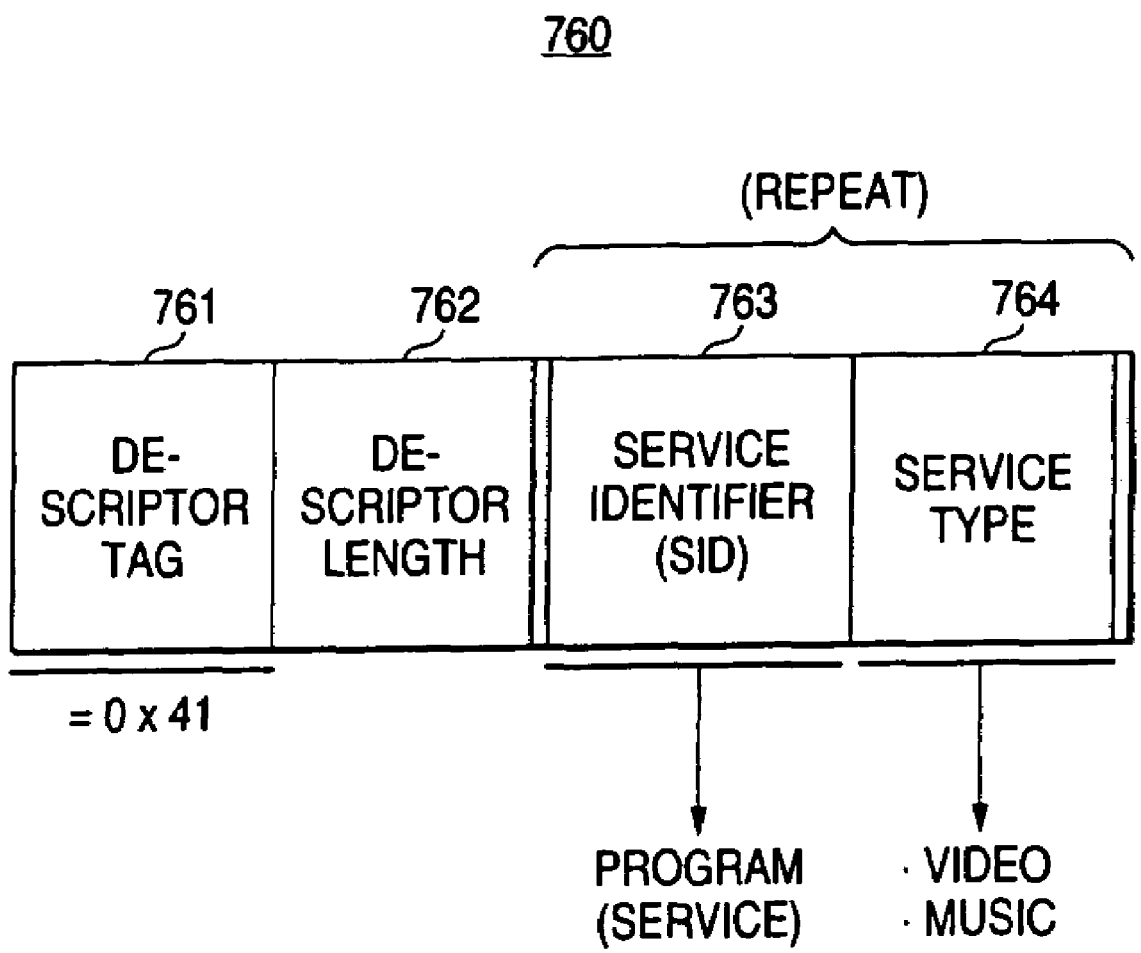
FIG. 11 is a diagram illustrating the constitution of a service list descriptor 760.

FIG. 11 is a diagram illustrating the constitution of a service list descriptor 760 included in the descriptor 744 in the network information table (NIT) 730. In the service list descriptor 760, a descriptor tag 751 represents "0x41". A descriptor length 762 represents the data length of the descriptor like the descriptor length 752.

A repeating portion describes data related to a service (program) provided in the transport stream identified by the TS identifier 741 in the network information table (NIT) 730. A service identifier (SID) 763 is for identifying the service and is the same as the program No. 714 in the program association table (PAT) 710 and the program No. 723 in the program map table (PMT) 720. A service type 764 represents the kind of the content of the service, and is the same as the stream type 724 of the program map table (PMT) 720.

In the descriptor 744 in the network information table (NIT) 730 as described above, the frequency 753 of the satellite delivery system descriptor 750 and the service identifier (SID) 763 of the service list descriptor 760 are provided for each transport stream (channel) in the networks.

Next, the frequency conversion according to the embodiment of the invention will be described with reference to the drawings.

Figure 12:
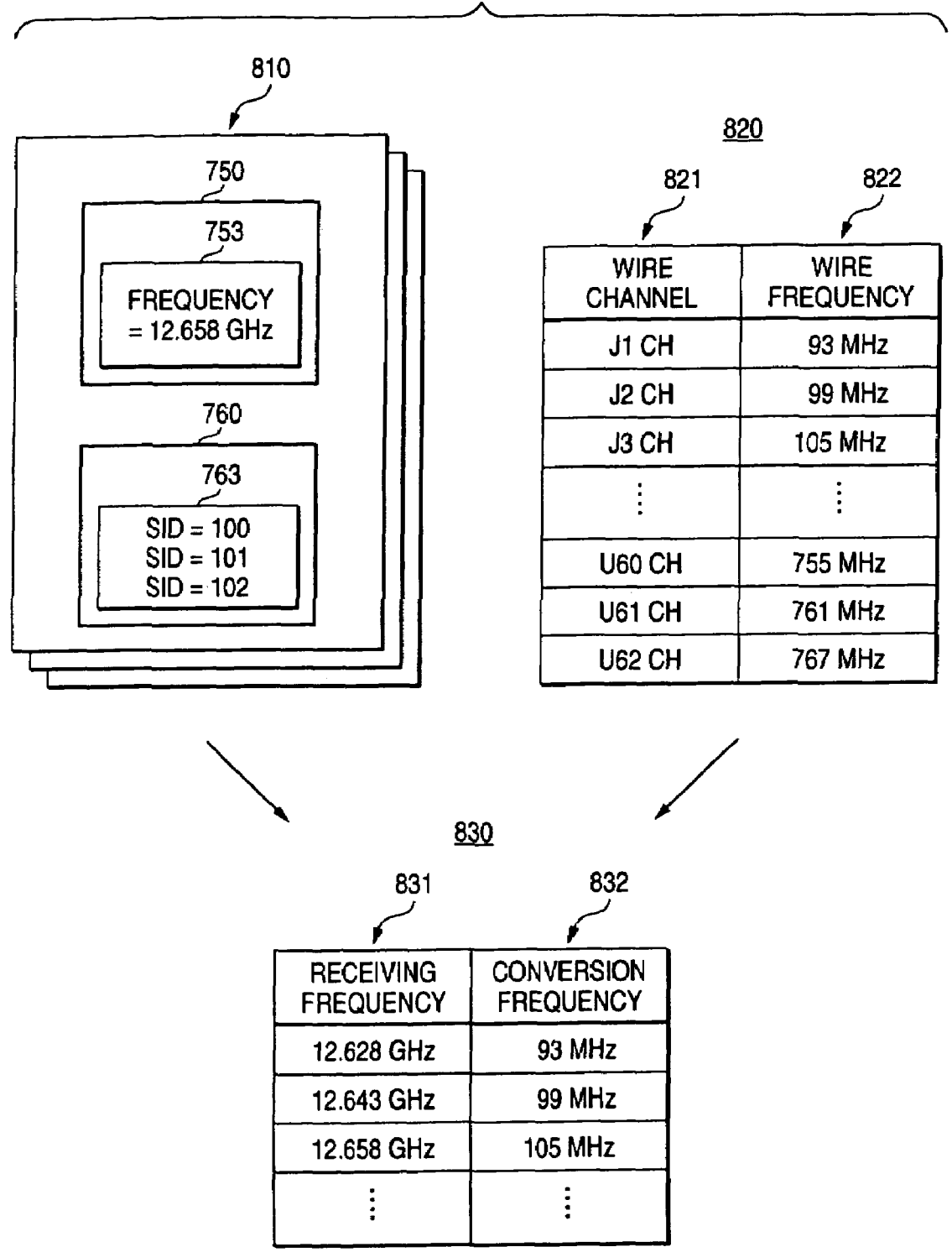
FIG. 12 is a diagram illustrating the concept of frequency conversion according to the embodiment of the invention.

FIG. 12 is a diagram illustrating the concept of frequency conversion according to the embodiment of the invention. As described in the foregoing, the signals received by the receiver unit 300 include data related to the transport stream (channel) in the networks. The data related to the channel is expressed as satellite receiving channel data 810 in FIG. 12. The satellite receiving channel data 810 includes the frequency 753 of the satellite delivery system descriptor 750 and the service identifier (SID) 763 of the service list descriptor 760.

A wire frequency table 820 is for holding the receiving channel of the receiver unit 300 and the frequency thereof. A wire channel 821 is a redelivering channel of the wired system in the cable 20 offered by the community redelivering facility 10 (FIG. 1). A wire frequency 822 is a redelivering frequency of the corresponding wire channel 821. That is, the wire frequency table 820 works as a redelivery frequency table.

The community redelivering facility 10 shifts the frequency that is redelivered in the modulation/conversion unit 100. Therefore, the frequency of channel data included in the received signals is not in agreement with the frequency on the real cable 20. Therefore, the frequency conversion table 830 renders the above two to be corresponded to each other. A receiving frequency 831 is a frequency transmitted in the satellite system before being redelivered. A conversion frequency 832 is a redelivering frequency transmitted in the wired system after being modulated and converted.

The frequency conversion table 830 is formed in the frequency search mode as described below. When the frequency search mode is set, the control unit 390 in the receiver unit 300 (FIG. 1) transmits selection data to the tuner 311 in order of, for example, increasing frequencies from the lower side toward the higher side based on a frequency registered to the wire frequency table 820.

It is judged whether the signals are received at the frequency that is set. When the signals are received, the network information table (NIT) 730 is obtained from the received signals, and the satellite receiving channel data 810 included in the network information table (NIT) 730 are picked up. The satellite receiving channel data 810 are rearranged in order of increasing frequencies 753.

The satellite channels in the rearranged satellite receiving channel data 810 are allocated for the channels of the wired system received in the frequency search mode.

The above processing must be executed for each of the networks. Thus, the frequency conversion table 830 is formed. After the frequency conversion table 830 is formed, the mode changes over to the receiving mode, and any desired channel can be selected based thereupon.

In order to select a desired channel by the receiver unit 300 in the receiving mode, there can be contrived (a) a method of suitably allocating the receiving frequency in response to a selection button of a remote controller like the reception of the current ground analog broadcast and (b) a method of inputting a service ID using a remote controller like the method of receiving CS digital broadcast.

According to the method (a), the conversion frequency 832 is set to a selection button of the remote controller, and the tuner 311 is controlled by depressing the selection button of the remote controller. For example, the selection button "8" is set to a frequency 105 MHz and is depressed so as to receive signals of the corresponding channel. By determining the service identifier (SID) of default, a program can be displayed. As the service identifier (SID) of default, the service identifier (SID) of a program viewed last may be stored or the program of the service identifier (SID) having the smallest number among the received channels may be selected.

When a program of other service identifier (SID) is to be received within the receiving channel, reference is made to the corresponding network information table (NIT) 730 by using the frequency conversion table 830, and the service identifier (SID) 763 is obtained from the corresponding network information table (NIT) 730. When, for example, the receiving frequency is 105 MHz, reference is made to the satellite receiving channel data 810 of 12.658 GHz using the frequency conversion table 830. The service identifier (SID) 763 is obtained from the satellite receiving channel data 810.

According to the method (b), a channel including the service identifier (SID) that is input is retrieved from the network information table (NIT) 730 like the existing receiver of digital CS broadcast, and the channel frequency including the service identifier (SID) is obtained from the satellite delivery system descriptor 750. The frequency represented by the network information table (NIT) 730 is converted by the frequency conversion table 830 into a corresponding frequency of the wire channel, and the selection data is instructed to the tuner 311 based thereupon to receive a desired program.

Next, described below with reference to the drawings is a display of a screen at the time of preparing the frequency conversion table 830 according to the embodiment of the invention.

Figure 13:
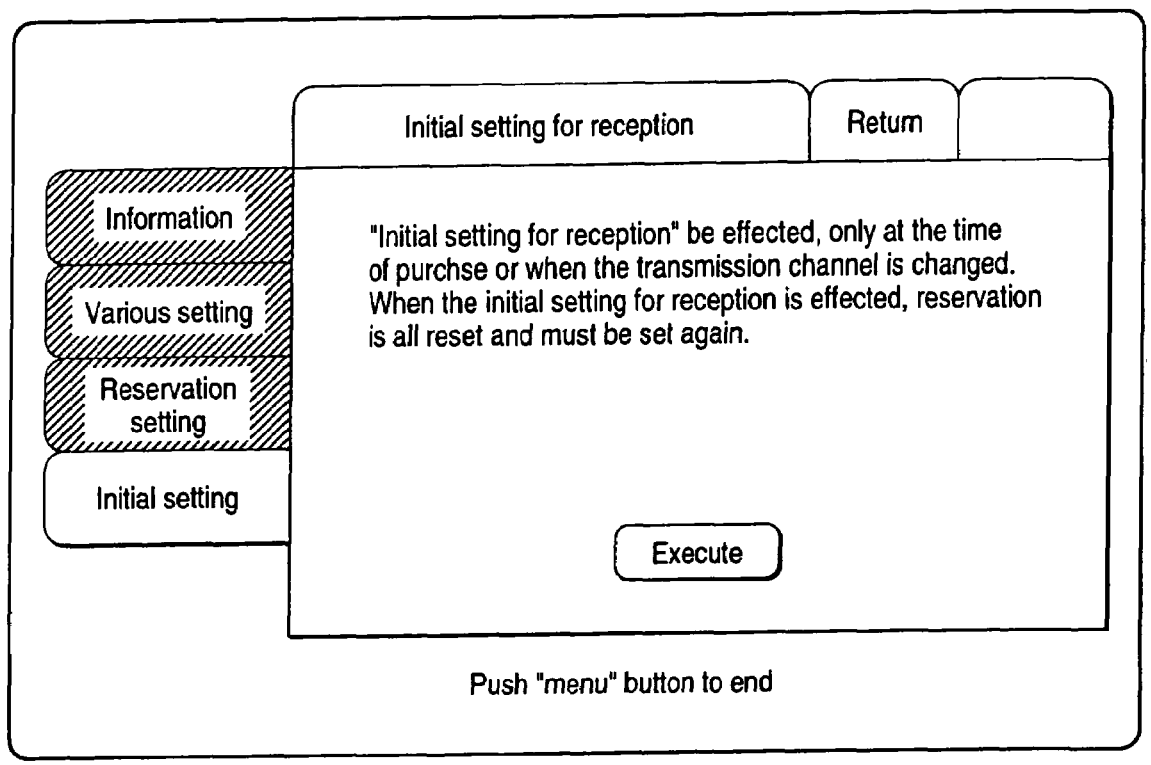
FIG. 13 is a diagram of a start screen for initial reception setting according to the embodiment of the invention.

FIG. 13 is a diagram illustrating a start screen for initially setting the reception according to the embodiment of the invention. The start screen is a user interface screen displayed on the picture receiver unit 400 when the power supply circuit is closed for the first time or when the channel delivered from the communication satellite is changed. When the user clicks an execution button on the screen, the frequency search mode starts operating to execute the processing for forming the frequency conversion table 830 as described above.

Figure 14:
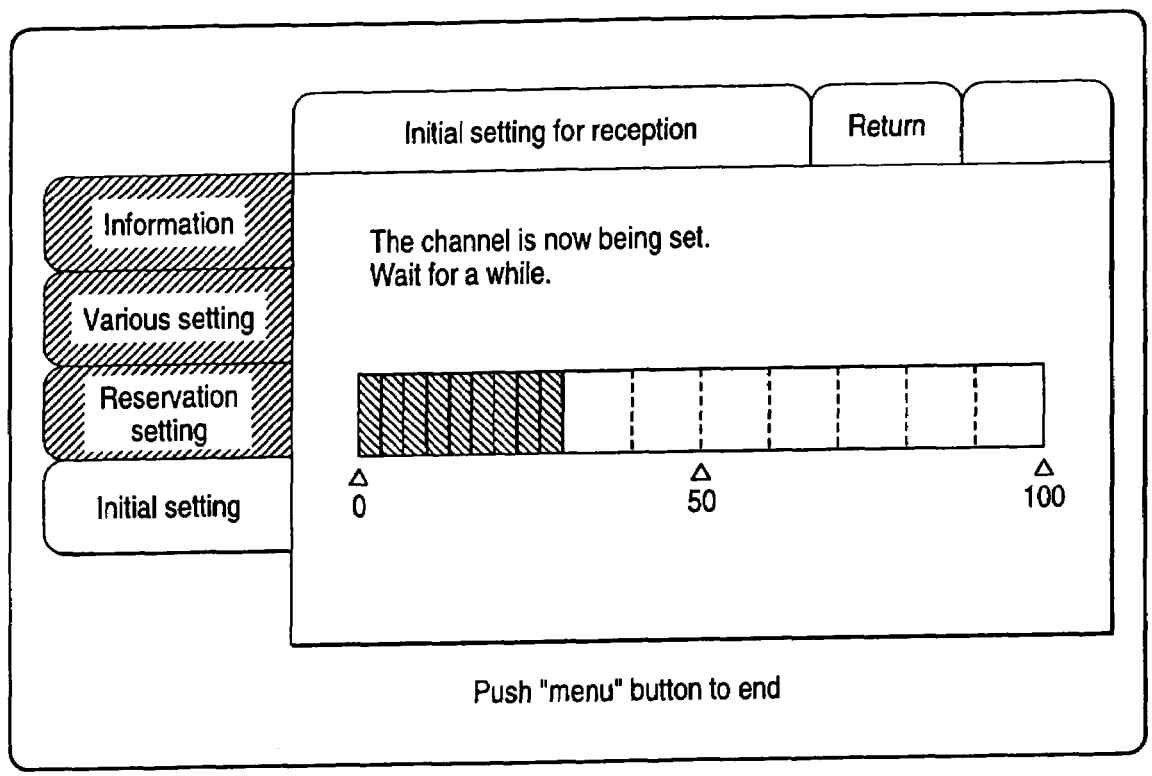
FIG. 14 is a diagram of a display screen during the processing for forming a frequency conversion table 830 according to the embodiment of the invention.

FIG. 14 is a diagram of a display screen during the processing for forming the frequency conversion table 830 according to the embodiment of the invention. To form the frequency conversion table 830, the channels being redelivered must all be searched and, hence, some periods of time (e.g., several minutes) are required. In a state where the frequency conversion table 830 has not been completed, normal reception (viewing) is not conducted. Therefore, some measures must be taken so that the user will not consider the device to be faulty. If the user erroneously considers that the device is faulty and interrupts the power supply to the receiver unit 300, then, the frequency conversion table 830 may not be normally prepared. While the frequency conversion table 830 is being prepared, therefore, the proceeding state of the processing is visually displayed as shown in FIG. 14.

Figure 15:
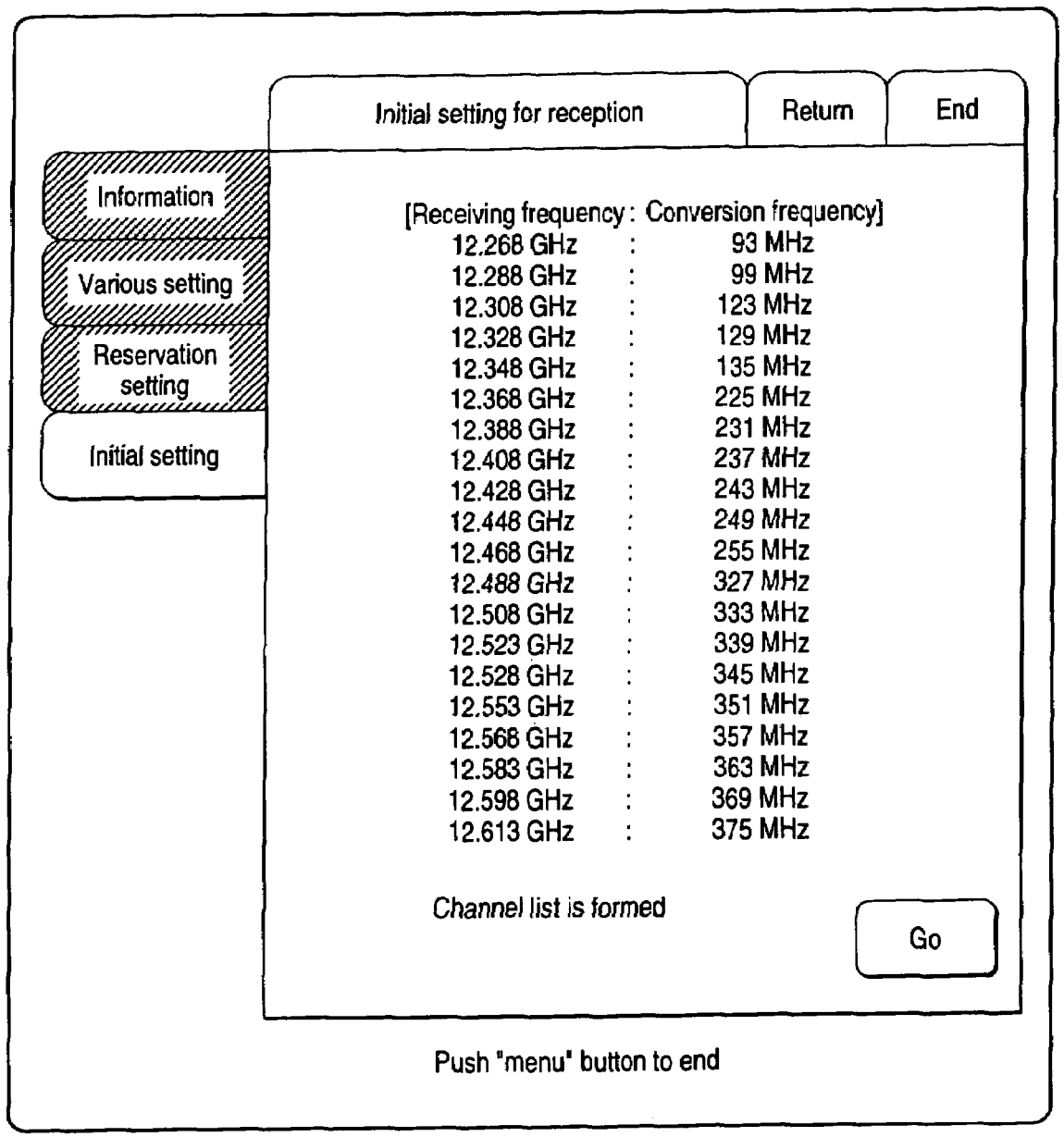
FIG. 15 is a diagram of a display after the end of the processing for forming the frequency conversion table 830 according to the embodiment of the invention.

FIG. 15 is a diagram of a display after the end of the processing for forming the frequency conversion table 830 according to the embodiment of the invention. The receiving frequencies 831 and the conversion frequencies 832 in the frequency conversion table 830 are displayed in pairs on the screen. Then, correlations of frequency data before and after the conversion can be visually comprehended.

Correlations between the channels used for the satellite transmission and the contents of programs multiplexed thereon are grasped by an enterprise providing the broadcast service. Therefore, in case a customer center of the enterpriser is queried by a user concerning the program watching state, it can be relatively easily judged whether the problem is on the transmitter side of the satellite or on the receiver side. However, when the signals are modulated and converted in the community receiving system and are redelivered to the wired transmission path, the arrangement of channels differs depending upon the state of empty channels in the wired transmission path in the community receiving system. Accordingly, correlations between the channels and the program data are not obtained at the customer center of the enterpriser who provides the service, and a query of the user may encounter a trouble. It is, therefore, useful to visually display the correlations of frequency data before and after the conversion.

Figure 16:
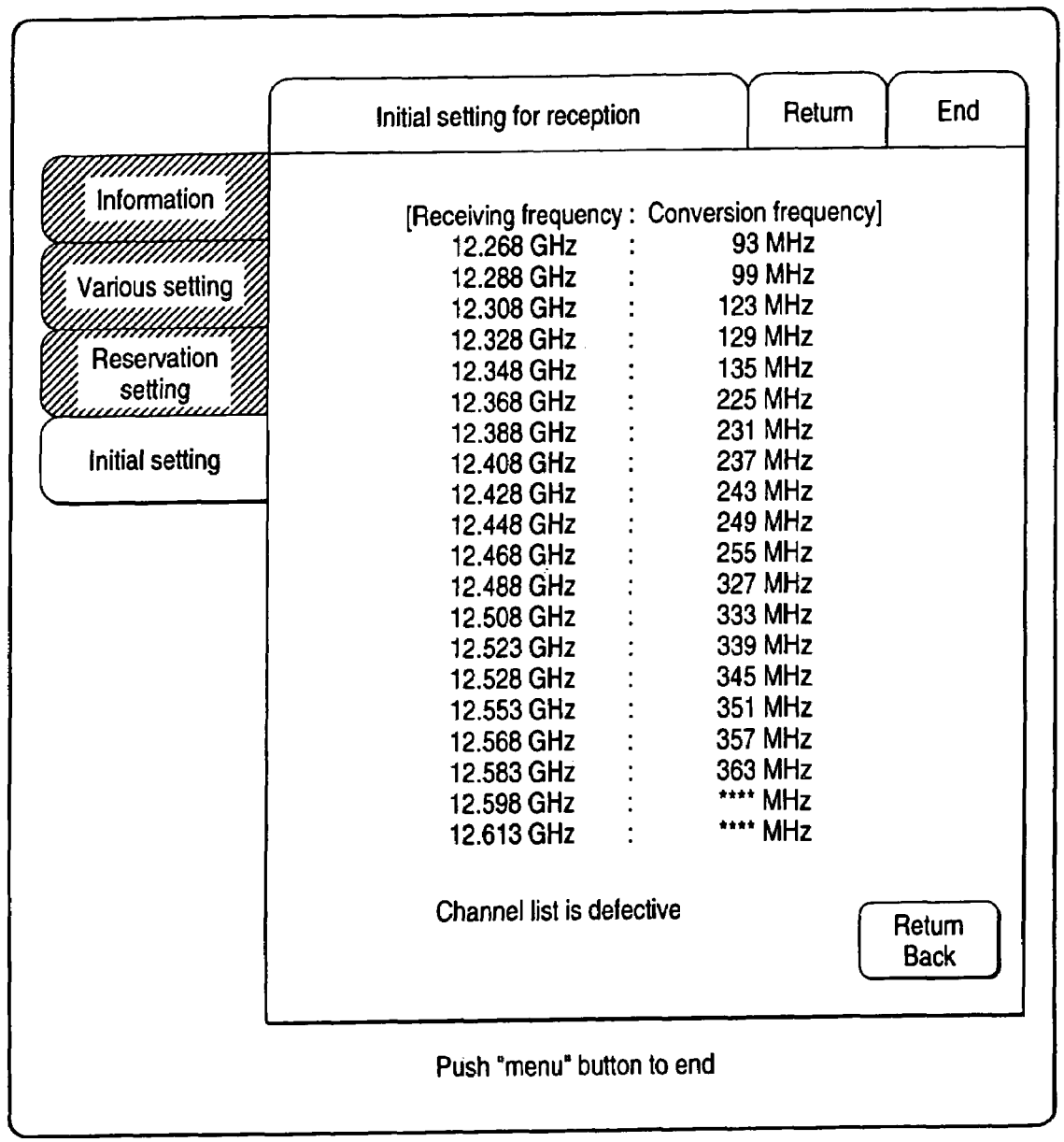
FIG. 16 is a diagram of a display of when the processing for forming the frequency conversion table 830 becomes defective according to the embodiment of the invention.

FIG. 16 is a diagram of a display of when the processing for forming the frequency conversion table 830 becomes defective according to the embodiment of the invention. In this example, the conversion frequencies have not been set for the last two receiving frequencies. The receiving frequencies 831 are obtained from the satellite receiving channel data 810, and only frequencies of channels on service (program) will have been displayed. The conversion frequencies 832, on the other hand, are those of the channels that could really be selected and received. Therefore, the conversion frequencies 832 may not be obtained in case the receiver unit 300 has failed to receive them due to intermittent defect caused by instantaneous noise or the like in the modulation/conversion unit 100. In such a case, therefore, the number of the receiving frequencies 831 may not become in agreement with the number of the conversion frequencies 832 in the frequency conversion table 830.

In case the processing for preparing the frequency conversion table 830 becomes defective as described above, a display like that of FIG. 16 is obtained on the screen promoting the user to effect the retrial. The frequency conversion table 830 may be automatically prepared again without the user's confirmation. In this case, however, a certain degree of limitation must be imposed on the number of times for consecutively effecting the retrial.

After the frequency conversion table 830 is prepared, further, the enterpriser who is providing the broadcast service adds a satellite transponder causing an increase in the channels. When the channels have increased, the frequency conversion table 830 must be formed again for converting the frequency data correspondingly. Therefore, the receiver unit 300 checks the version No. 734 of the network information table (NIT) 730, checks the number of the frequency data every time the version No. 734 is updated and compares the number with the number of the frequency data in the frequency conversion table 830. When the number of the frequency data in the network information table (NIT) 730 is larger, the user is urged to effect the retrial like the case of FIG. 16.

Here, the number of frequency data in the network information table (NIT) 730 can be confirmed in a manner as described below. For example, in the descriptor 744 of the network information table (NIT) 730, the satellite delivery system descriptor 750 is picked up by the descriptor tag 51, and the number is confirmed by interpreting the frequencies 753 one by one. Further, the length of the next repeating portion of the TS loop length 740 of the network information table (NIT) 730 is found, and the TS loop length 740 is divided by the length of the repeating portion to confirm the number of repetition (i.e., the number of the frequency data).

In the foregoing was described the case where the satellite channels were added. When the satellite channels are deleted, however, a message is displayed saying that no service is being provided even though the service is designated by the original frequency or the service identifier (SID). Therefore, no particular trouble is caused even if the frequency conversion table 830 is not readily formed again.

Next, a flow of processing of the receiver unit 300 according to the embodiment of the invention will be described with reference to the drawings. The processing described here is realized being controlled by the control unit 390.

Figure 17:
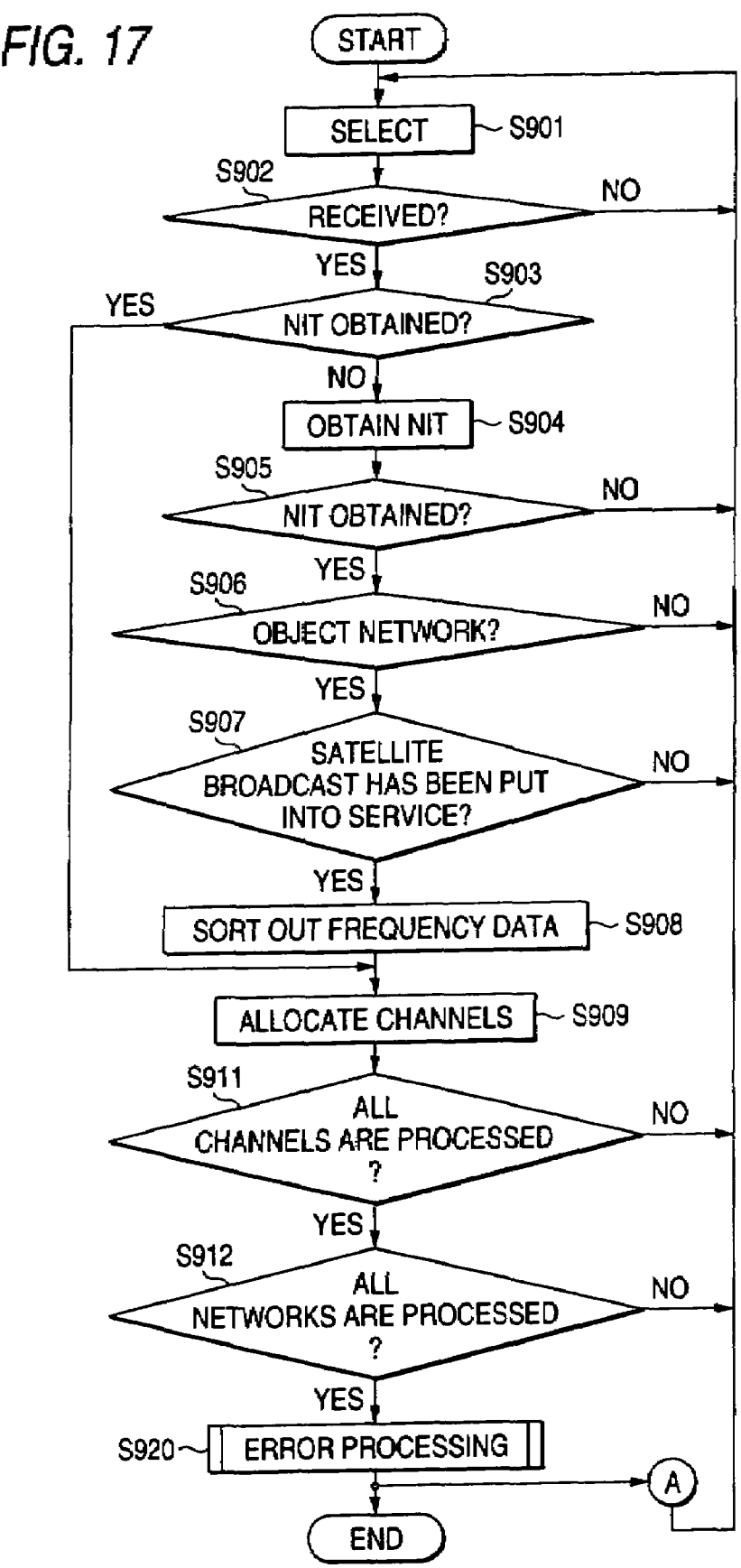
FIG. 17 is a diagram illustrating the flow of the processing for forming the frequency conversion table 830 according to the embodiment of the invention.

FIG. 17 is a diagram illustrating the flow of a processing for forming the frequency conversion table 830 according to the embodiment of the invention. First, when the frequency search mode starts operating, the tuner 311 successively selects the frequency starting from a low frequency according to the wire frequency table 820 (step S901). The control unit 390 judges whether the signals are being received at a frequency selected by the tuner 311 (step S902). When the signals are received, a front end (F/E) lock signal is output from the front end portion 310. The F/E lock signal represents that the demodulation and error correction are normally effected and that a transport stream is normally output. When the signals are not normally received, the frequency is selected again staring with a next frequency (step S901).

When the signals are normally received at step S901 (step S902), the network information table (NIT) 730 is picked up from the received signals (step S904). However, when the network information table (NIT) 730 has already been obtained concerning the network (S903), the network information table (NIT) 730 is not picked up and the routine proceeds to step S909 to execute a processing for allocating the frequencies. This is because, once the network information table (NIT) 730 is obtained, there can be obtained data related to all channels pertaining to the network.

When the network information table (NIT) 730 is not obtained at step S904 (S905), the frequency is selected again starting with a next frequency (step S901). When, for example, the received signals do not include the broadcast wave, the network information table (NIT) 730 is not often obtained.

When the network information table (NIT) 730 is obtained at step S904, the network identifier 733 in the network information table (NIT) 730 judges whether the signals are those of the object network (step S906). When there are a plurality of object networks, it is necessary that a particular network is regarded as an object network and that, after all channels in the network are allocated, a next network is regarded as the object network. This is to obey the above-mentioned first rule for frequency arrangement. When it is judged at step S906 that the signals are not those of the object network, the frequencies are selected again starting with a next frequency (step S901).

When it is judged at step S906 that the signals are those of the object network, the descriptor 744 in the network information table (NIT) 730 judges whether the satellite broadcast has been put into service (step S907). Concretely speaking, it is judged whether the descriptor tag 751 ("0x43") of the satellite delivery system descriptor 750 has been included in the descriptor 744. For example, if the descriptor tag is "0x44", then, it is the wired broadcast service. If the descriptor tag is "0xFA", then, it is the ground wave broadcast service. In this case, the frequencies are selected gain starting with a next frequency (step S901).

When it is judged at step S907 that it is the satellite broadcast service, the descriptor 744 in the network information table (NIT) 730 is obtained, and the frequencies 753 in the satellite delivery system descriptor 750 are arranged in order of increasing frequencies (step S908). As represented by the satellite receiving channel data 810, the descriptor 744 includes, in a random fashion, the data related to a plurality of channels on the network (satellite). At step S908, therefore, the data are rearranged in order of frequencies. This is to obey the above second rule for frequency arrangement.

The thus rearranged frequencies 753 of the satellite delivery system descriptor 750 are arranged in order in the receiving frequencies 831 of the frequency conversion table 830. Further, the selected frequencies of the wired system are allocated in order for the conversion frequencies 832 of the frequency conversion table 830 (step S909). Once received successfully, the network information table (NIT) 730 obtained by the received signals is common in the same network (satellite). Therefore, the receiving frequencies 831 may be registered at first at one time. However, the conversion frequencies 832 must be selected one by one (step S901) to confirm the normal channels (steps S902 to S907). Accordingly, the selection is repeated until all channels of the wired frequency table 820 are confirmed (step S911).

All channels in the object network are confirmed to complete the registration to the frequency conversion table 830. If there is still any network to be processed, then, this network is regarded as the object network, and the above processing is repeated (step S912).

After all object networks are processed, a processing is conducted to check whether the frequency conversion table 830 is normally formed and whether error is occurred (step S920).

Figure 18:
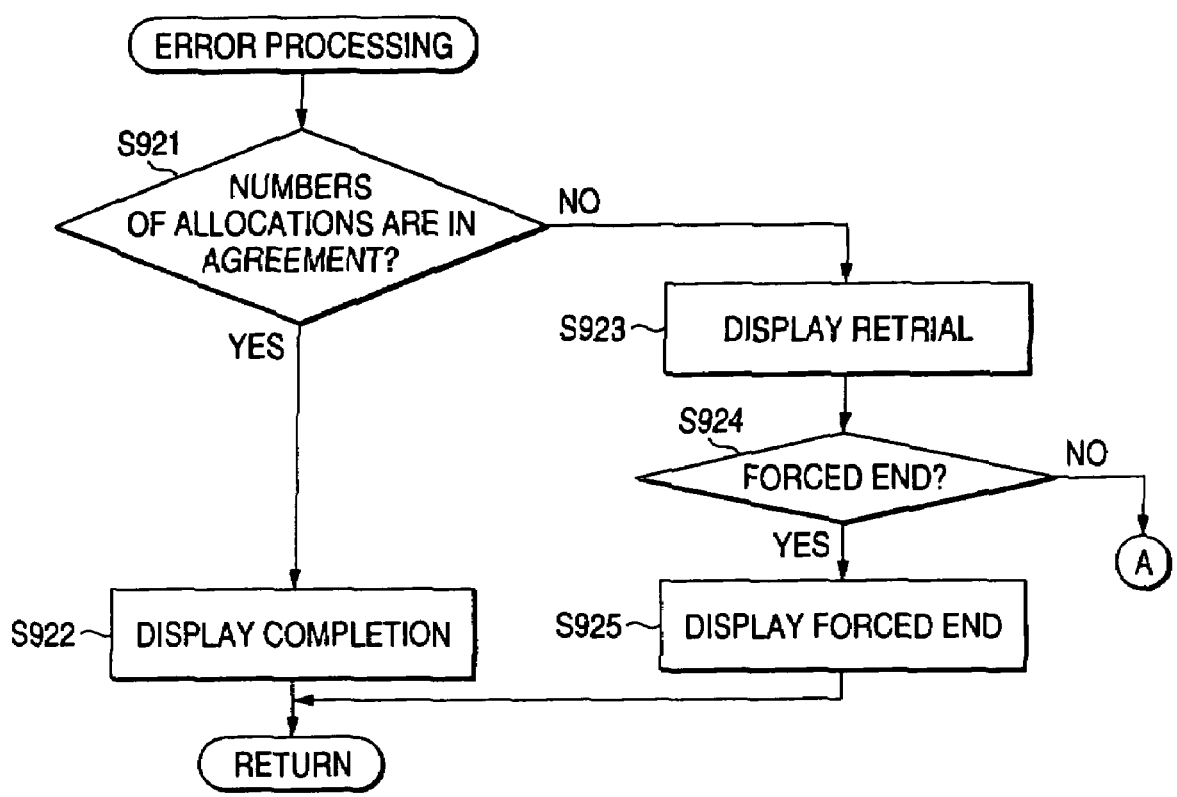
FIG. 18 is a diagram illustrating the flow of an error processing after the frequency conversion table 830 has been formed according to the embodiment of the invention.

FIG. 18 is a diagram illustrating a flow of the error processing (step S920 in FIG. 17) after the frequency conversion table 830 is formed according to the embodiment of the invention. If the number of the receiving frequencies 831 is in agreement with the number of the conversion frequencies 832 in the frequency conversion table 830 that is formed (step S921), completion of formation of the frequency conversion table 830 is displayed (step S922) as shown in FIG. 15.

If the number of the receiving frequencies 831 is not in agreement with the number of the conversion frequencies 832 at step S921, a message is displayed saying that the formation of the frequency conversion table 830 is defective as shown in FIG. 16, and a message is displayed to promote the retrial (step S923). When the user selects the retrial in accordance with the display of retrial (step S924), the routine returns back to step S901 of FIG. 17 to select the frequencies. When the user does not select the retrial at step S924 but selects the forced end, the forced end is displayed (step S925) and the processing ends without forming again the frequency conversion table 830.

Figure 19:
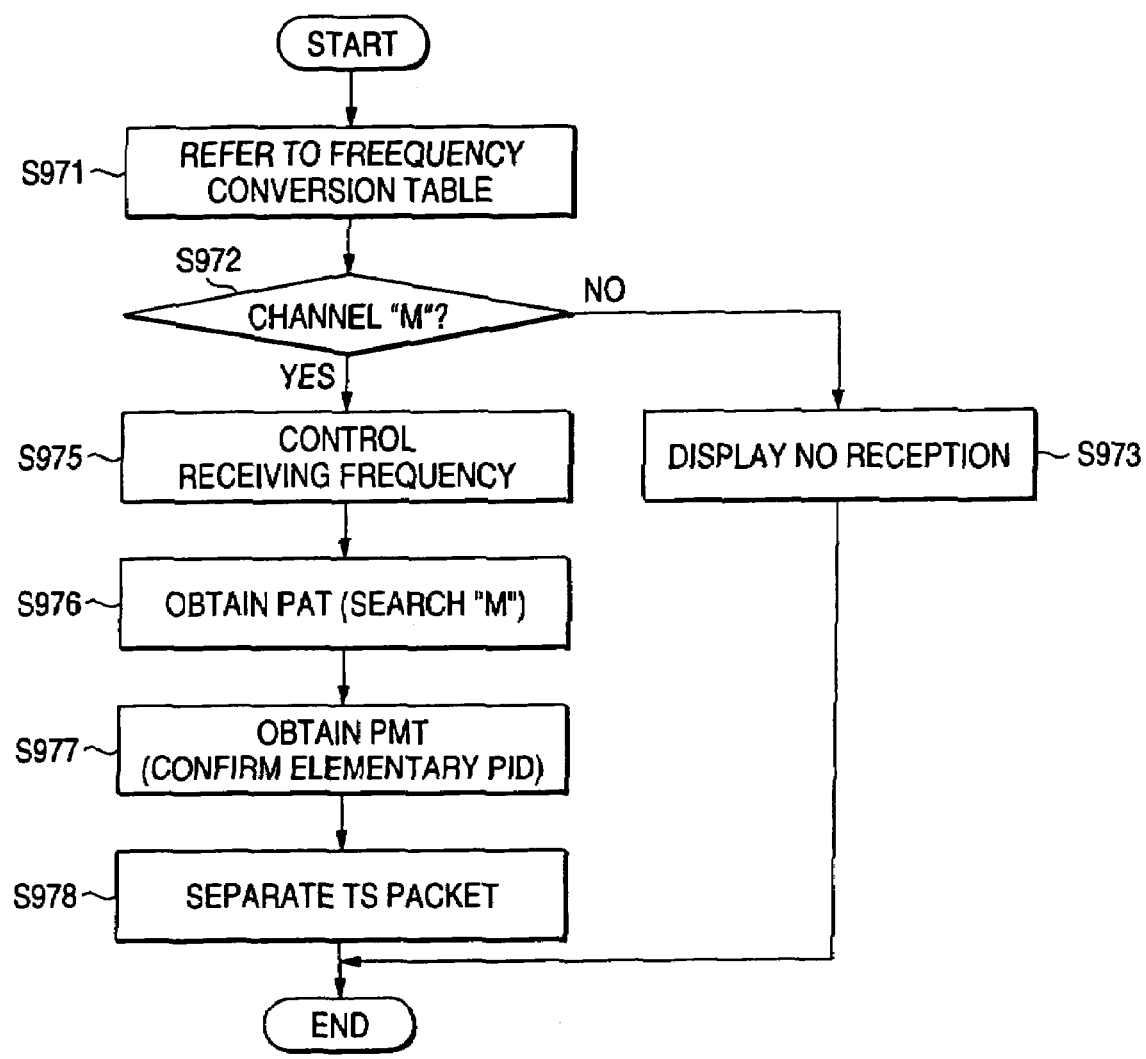
FIG. 19 is a diagram illustrating the flow of operation in the reception mode according to the embodiment of the invention.

FIG. 19 is a diagram illustrating a flow of operation in the receiving mode according to the embodiment of the invention. FIG. 19 illustrates the operation of when a channel "M" is specified by using the remote controller (not shown).

First, when the channel "M" is specified, the frequency conversion table 830 is retrieved by the frequency (conversion frequency 832) of the wired system of the channel "M", and a frequency (receiving frequency 831) of the corresponding satellite system is obtained (step S971). When the frequency data corresponding to the channel "M" is not present in the frequency conversion table 830 (step S972), a message is displayed saying that the channel "M" is not received (step S973).

When the frequency data corresponding to the channel "M" is present in the frequency conversion table 830 at step S972, the frequency of the wired system of the channel "M" is set to the tuner 311, and the network information table (NIT) 730 is obtained from the received signals (step S975). The frequency in agreement with the receiving frequency 831 corresponding to the channel "M" is retrieved from the frequency 753 in the satellite delivery system descriptor 750 in the network information table (NIT) 730 of the received signals, and the service identifier (SID) 763 corresponding to the frequency 753 the coincidence of which was detected is picked up from the service list descriptor 760. Here, when the plurality of service identifiers (SID) 763 are picked up, there can be contrived a method of storing the service identifier (SID) of a program that was watched last, or a program having the smallest number of the service identifier (SID) may be selected out of the receiving channels.

Then, the program association table (PAT) 710 is obtained, and a program No. 714 in agreement with the service identifier (SID) obtained above is retrieved (step S976). A packet identifier (PID) 715 corresponding to the retrieved program No. 714 is obtained.

Due to the packet identifier (PID) 715 thus obtained, the program map table (PMT) 720 is obtained next (step S977). The elementary PID 725 is confirmed from the program map table (PMT) 720 for each stream type 724. Due to the elementary PID 725, the video packet and the audio packet are separated (step S978). Thus, the desired channel "M" is received.

Figure 20:
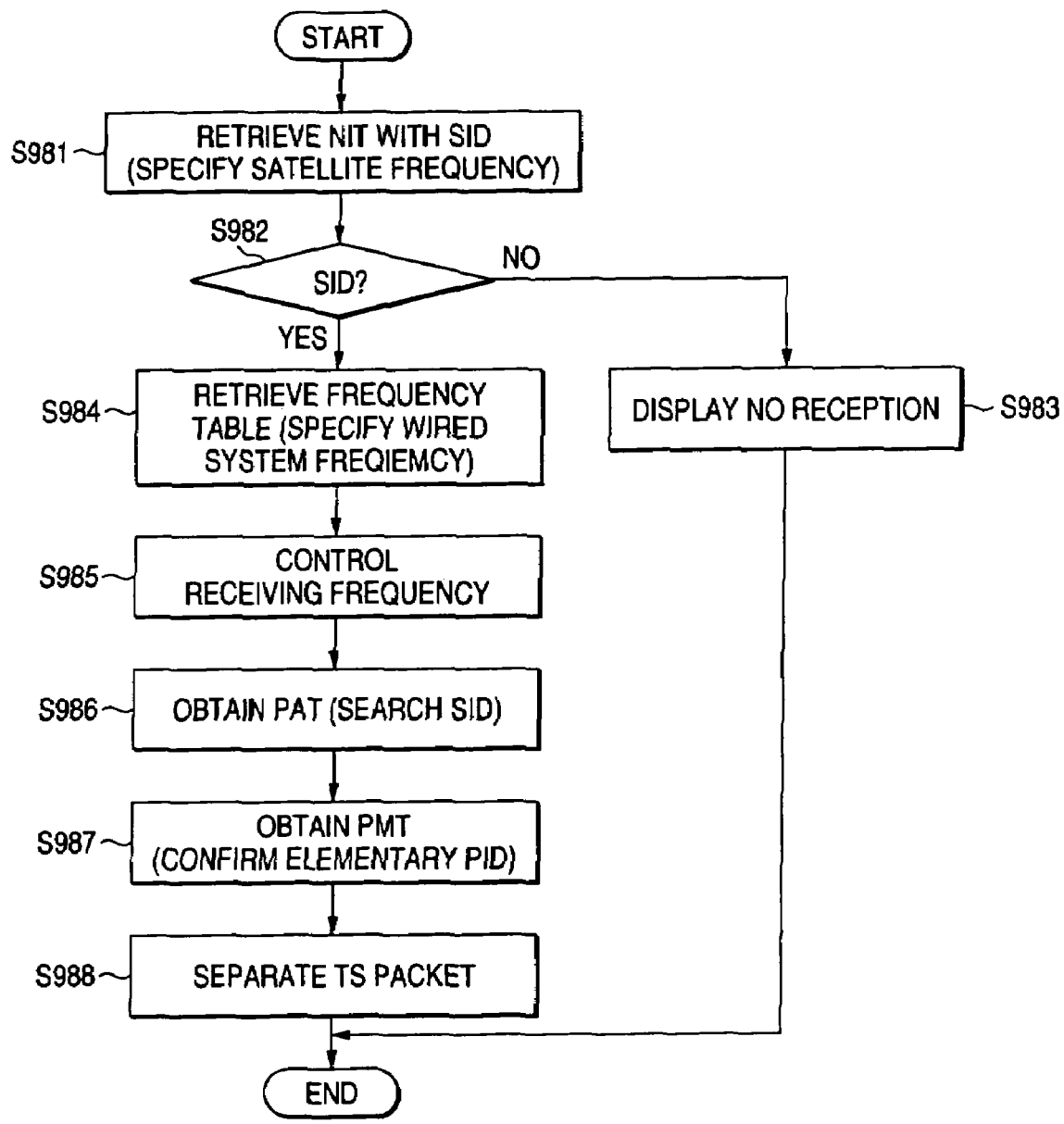
FIG. 20 is a diagram illustrating another flow of operation in the reception mode according to the embodiment of the invention.

FIG. 20 is a diagram illustrating another flow of the operation in the receiving mode according to the embodiment of the invention. FIG. 20 illustrates the operation of when a particular service identifier (SID) is designated by the remote controller (not shown).

First, when the service identifier (SID) is specified, a channel in agreement with the service identifier (SID) is retrieved in the satellite delivery system descriptor 750 (FIG. 12) in the network information table (NIT) 730 (satellite receiving channel data 810) that has been received in advance, thereby to obtain a satellite frequency 753 (step S981). When the frequency data corresponding to the service identifier (SID) is not existing in the satellite receiving channel data 810 (step S982), a message is displayed saying that the service identifier (SID) is not received (step S983).

When a channel in agreement with the service identifier (SID) is retrieved at step S982, the frequency 753 (receiving frequency 831) of the satellite system is converted by the frequency conversion table 830 into the wired system frequency (conversion frequency 832) (step S984). The frequency of the wired system is set to the tuner 311 to receive the signals (step S985).

Then, the program association table (PAT) 710 is obtained and a program No. 714 in agreement with the object service identifier (SID) is retrieved (step S986). Then, a packet identifier (PID) 715 corresponding to the retrieved program No. 714 is obtained.

Due to the thus obtained packet identifier (PID) 715, the program map table (PMT) 720 is obtained next (step S987). The elementary PID 725 is confirmed from the program map table (PMT) 720 for each stream type 724. Due to the elementary PID 725, the video packet and the audio packet are separated (step S988). Then, a channel corresponding to the desired service identifier (SID) is received.

Figure 21:
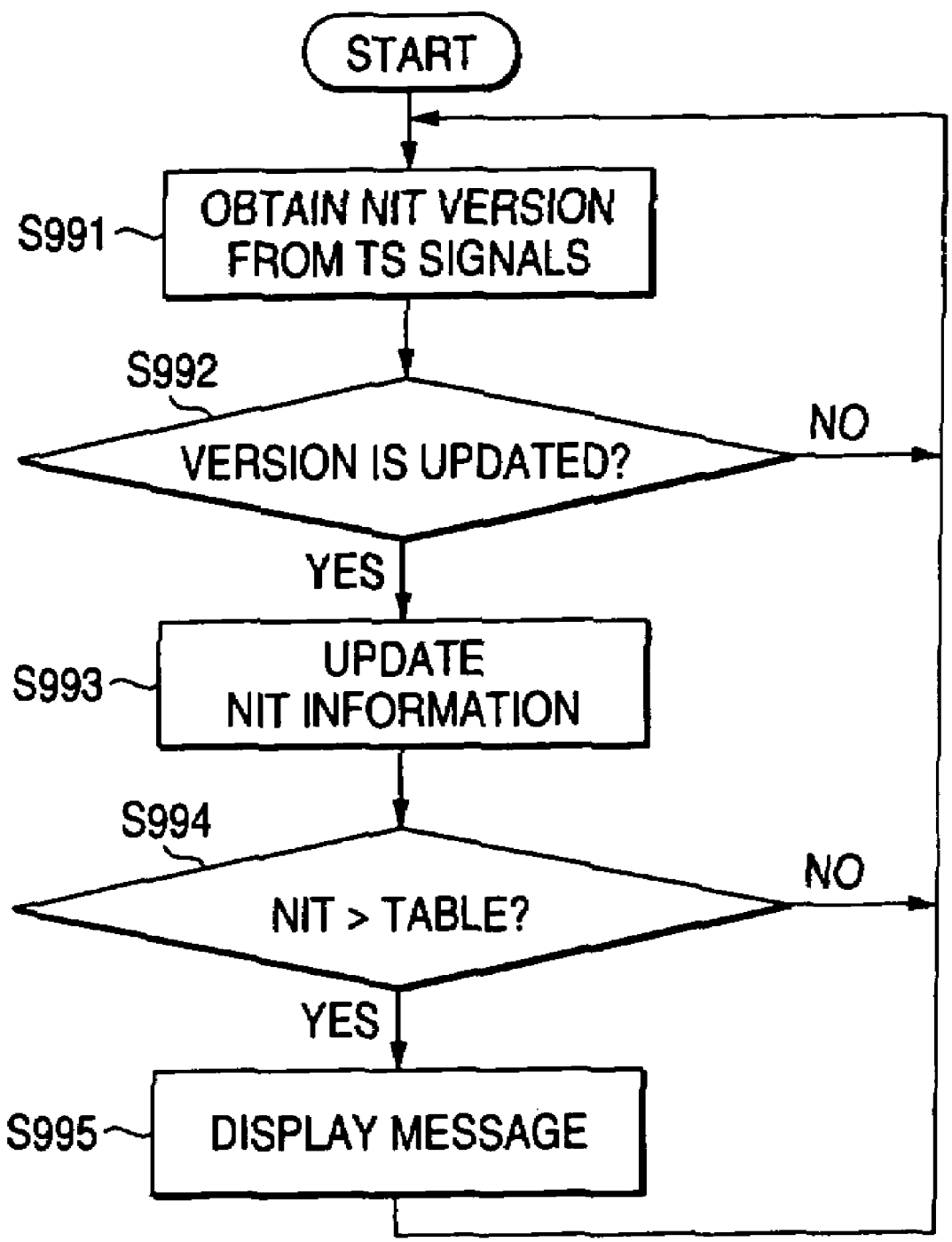
FIG. 21 is a diagram illustrating the flow of a processing for promoting the retrial for forming the frequency conversion table 830 according to the embodiment of the invention.

FIG. 21 is a diagram illustrating a flow of processing for promoting the retrial for forming the frequency conversion table 830 according to the embodiment of the invention. After the frequency conversion table 830 is formed as described earlier, a satellite transponder is added by the enterpriser who is providing the broadcast service to cope with an increase in the channels.

In normal operation, the receiver unit 300 checks a version No. 734 of the network information table (NIT) 730 in the received signals (step S991). Any particular processing is not executed unless the version No. 734 is updated (step S992).

When the version No. 734 has been updated at step S992, the satellite receiving channel data 810 is updated (step S993) The number of the frequency data is confirmed in the updated satellite receiving channel data 810, and is compared with the number of the frequency data in the frequency conversion table 830 (step S994). As a result, if the number of the frequency data in the updated satellite receiving channel data 810 is larger than the number of the frequency data in the frequency conversion table 830, a message is displayed to promote the retrial for forming the frequency conversion table 830 (step S995).

Thus, the frequency conversion table 830 can be suitably formed again even when the channels of the satellite system have increased.

According to the embodiment of the invention as described above, the frequencies in the modulation/conversion unit 100 in the community receiving system are arranged according to a predetermined rule, the satellite receiving channel data 810 are rearranged in the receiver unit 300 for each of the networks and are allocated to the channels that are capable of normally receiving the signals, so that the frequency data of the satellite system are corresponded to the frequency data of the wired system. That is, by contriving the arrangement of frequencies in the modulation/conversion unit 100, the frequency can be set in the receiver unit 300 according to a simple procedure.

According to the embodiment of the invention, further, any occurrence of defect in the frequency setting or an increase in the channels in the satellite system, is detected to promote the retrial for setting the frequency.

In the embodiment of the invention, the frequencies are arranged in the modulation/conversion unit 100 in order to increasing frequencies of the satellite system. In the receiver unit 300, too, the frequencies of the satellite system are rearranged in order of increasing frequencies. The order of the modulation/conversion device 100 may be in agreement with that of the receiver unit 300. Accordingly, the frequencies in the modulation/conversion unit 100 may be arranged in order of decreasing frequencies of the satellite system. In the receiver unit 300, too, the frequencies may be rearranged in order of decreasing frequencies of the satellite system.

In this embodiment, further, the frequencies of the wired system are allocated in order of increasing frequencies in the frequency arrangement of the modulation/conversion unit 100, and the frequencies of the wired system are allocated in order of increasing frequencies even in the receiver unit 300. The order of the modulation/conversion unit 100, however, may be in agreement with that of the receiver unit 300. Therefore, the frequencies of the wired system are allocated in decreasing order in the frequency arrangement of the modulation/conversion unit 100. In the receiver unit 300, too, the frequencies of the wired system may be allocated in decreasing order.

Though the invention was described above by way of the embodiment, it should be noted that the invention is in no way limited thereto only, but can be modified in a variety of ways without departing from the gist and scope of the invention.

The procedure of processing described above may be comprehended as a method comprising a series of procedures, or may be comprehended as a computer-readable medium storing a program for having a computer execute the above series of procedures.

The invention claimed is:

1. A receiver unit used in a community receiving system which redelivers broadcast signals from a plurality of networks, comprising:

a redelivering frequency table for holding a redelivering frequency of broadcast signals that are redelivered;

means for successively selecting the broadcast signals of said redelivering frequency held by said redelivering frequency table for each of said networks;

means for obtaining channel data of a channel included in the network that provides successfully selected broadcast signals among said plurality of networks;

means for rearranging the channel data for each of said networks according to a predetermined order; and means for rendering said rearranged channel data to be corresponded to the redelivering frequency of the successfully selected broadcast signals, a frequency conversion table is created for an object network by obtaining network information for the object network, obtaining from the network information a frequency of a system that generates the broadcast signals, and obtaining from the network information a service identifier for each channel associated with the object network, the frequency conversion table is updated when the receiver unit receives an indication that the network information has changed and there is an increase in the number of broadcast signals that are to be redelivered, such that the frequency conversion table is not updated when the receiver unit receives an indication that the network information has changed but there is not an increase in the number of broadcast signals that are to be redelivered.

2. A receiver unit according to claim 1, wherein the channel data has a frequency before the redelivery in said network in said channel, and provision is further made of means for forming said frequency conversion table for rendering the frequency before the redelivery of the rearranged channel data to be corresponded to the redelivering frequency of the successfully selected broadcast signal.

3. A receiver unit according to claim 2, wherein said channel data further has a service identifier of a service included in said channel.

4. A receiver unit according to claim 2, further comprising means for displaying the content of said frequency conversion table.

5. A receiver unit according to claim 2, further comprising:

means for comparing the number of the frequencies before the redelivery of said channel data with the number of the redelivering frequencies of said successfully selected broadcast signals; and means for promoting the retrial when the number of the frequencies before the redelivery of said channel data is not in agreement with the number of the redelivering frequencies of said successfully selected broadcast signals.

6. A receiver unit according to claim 2, further comprising:

means for obtaining second channel data having a frequency before the redelivery of the channel included in said plurality of networks after said frequency conversion table has been formed;

means for comparing the number of the frequencies before the redelivery of said second channel data with the number of the redelivering frequencies of said frequency conversion table; and means for promoting the retrial when the number of the frequencies before the redelivery of said second channel data is not in agreement with the number of the redelivering frequencies of said frequency conversion table.

7. A receiver unit according to claim 2, further comprising means for displaying the proceeding state of the processing until said frequency conversion table is formed.

8. A method of setting a frequency in a receiver unit provided with a redelivering frequency table for holding a redelivering frequency of broadcast signals redelivered in a community receiving system that redelivers the broadcast signals from a plurality of networks, comprising:

a procedure for successively selecting the broadcast signals of the redelivering frequency held by said redelivering frequency table for each of said networks;

a procedure for obtaining channel data of a channel included in the network that provides successfully selected broadcast signals among said plurality of networks;

a procedure for rearranging the channel data for each of said networks according to a predetermined order; and a procedure for rendering said rearranged channel data to be corresponded to the redelivering frequency of said successfully selected broadcast signals, a frequency conversion table is created for an object network by obtaining network information for the object network, obtaining from the network information a frequency of a system that generates the broadcast signals, and obtaining from the network information a service identifier for each channel associated with the object network, the frequency conversion table is updated when the receiver unit receives an indication that the network information has changed and there is an increase in the number of broadcast signals that are to be redelivered, such that the frequency conversion table is not updated when the receiver unit receives an indication that the network information has changed but there is not an increase in the number of broadcast signals that are to be redelivered.

9. A method of setting a frequency in a receiver unit provided with a redelivering frequency table for holding a redelivering frequency of broadcast signals redelivered in a community receiving system that redelivers the broadcast signals from a plurality of networks, comprising:

a procedure for successively selecting the broadcast signals of said redelivering frequency held by said redelivering frequency table for each of said networks;

a procedure for obtaining channel data having a frequency before the redelivery of a channel included in the network that provides the successfully selected broadcast signals among the plurality of networks;

a procedure for rearranging said channel data for each of said networks according to a predetermined order; and a procedure for forming a frequency conversion table that renders the frequency before the redelivery of said rearranged channel data to be corresponded to the redelivering frequency of said successfully selected broadcast signals, said frequency conversion table is created for an object network by obtaining network information for the object network, obtaining from the network information a frequency of a system that generates the broadcast signals, and obtaining from the network information a service identifier for each channel associated with the object network, the frequency conversion table is updated when the receiver unit receives an indication that the network information has changed and there is an increase in the number of broadcast signals that are to be redelivered, such that the frequency conversion table is not updated when the receiver unit receives an indication that the network information has changed but there is not an increase in the number of broadcast signals that are to be redelivered.

10. A method of setting a frequency according to claim 9, further comprising:
- a procedure for comparing the number of the frequencies before the redelivery of said channel data with the number of the redelivering frequencies of the successfully selected broadcast signals; and
- a procedure for promoting the retrial when the number of the frequencies before the redelivery of said channel data is not in agreement with the number of the redelivering frequencies of said successfully selected broadcast signals.

11. A method of setting a frequency according to claim 9, further comprising:
- a procedure for obtaining second channel data having a frequency before the redelivery of the channel included in said plurality of networks after said frequency conversion table has been formed;
- a procedure for comparing the number of the frequencies before the redelivery of said second channel data with the number of the redelivering frequencies of said frequency conversion table; and
- a procedure for promoting the retrial when the number of the frequencies before the redelivery of said second channel data is not in agreement with the number of the redelivering frequencies of said frequency conversion table.

12. A computer-readable recording medium storing a program used for a receiver unit provided with a redelivering frequency table for holding a redelivering frequency of broadcast signals redelivered in a community receiving system that redelivers the broadcast signals from a plurality of networks, said a program causing a computer to execute:
- a procedure for successively selecting the broadcast signals of said redelivering frequency held by said redelivering frequency table for each of said networks;
- a procedure for obtaining channel data of a channel included in the network that provides the successfully selected broadcast signals among said plurality of networks;
- a procedure for rearranging said channel data for each of said networks according to a predetermined order; and
- a procedure for rendering said rearranged channel data to be corresponded to the redelivering frequency of said successfully selected broadcast signals,
- a frequency conversion table is created for an object network by obtaining network information for the object network, obtaining from the network information a frequency of a system that generates the broadcast signals, and obtaining from the network information a service identifier for each channel associated with the object network,
- the frequency conversion table is updated when the receiver unit receives an indication that the network information has changed and there is an increase in the number of broadcast signals that are to be redelivered, such that the frequency conversion table is not updated when the receiver unit receives an indication that the network information has changed but there is not an increase in the number of broadcast signals that are to be redelivered.

13. A computer-readable recording medium storing a program used for a receiver unit provided with a redelivering frequency table for holding a redelivering frequency of broadcast signals redelivered in a community receiving system that redelivers the broadcast signals from a plurality of networks, said program causing a computer to execute:
- a procedure for successively selecting the broadcast signals of said redelivering frequency held by said redelivering frequency table for each of said networks;
- a procedure for obtaining channel data having a frequency before the redelivery of a channel included in the network that provides said successfully selected broadcast signals among said plurality of networks;
- a procedure for rearranging said channel data for each of said networks according to a predetermined order; and
- a procedure for forming a frequency conversion table that renders the frequency before the redelivery of said rearranged channel data to be corresponded to the redelivering frequency of said successfully selected broadcast signals,
- said frequency conversion table is created for an object network by obtaining network information for the object network, obtaining from the network information a frequency of a system that generates the broadcast signals, and obtaining from the network information a service identifier for each channel associated with the object network,
- the frequency conversion table is updated when the receiver unit receives an indication that the network information has changed and there is an increase in the number of broadcast signals that are to be redelivered, such that the frequency conversion table is not updated when the receiver unit receives an indication that the network information has changed but there is not an increase in the number of broadcast signals that are to be redelivered.

14. A computer-readable recording medium according to claim 13, wherein said recording medium stores a program which causes a computer to execute:
- a procedure for comparing the number of the frequencies before the redelivery of said channel data with the number of the redelivering frequencies of said successfully selected broadcast signals; and
- a procedure for promoting the retrial when the number of the frequencies before the redelivery of said channel data is not in agreement with the number of the redelivering frequencies of said successfully selected broadcast signals.

15. A computer-readable recording medium according to claim 13, wherein said recording medium stores a program which causes a computer to execute:
- a procedure for obtaining second channel data having a frequency before the redelivery of the channel included in said plurality of networks after said frequency conversion table has been formed;
- a procedure for comparing the number of the frequencies before the redelivery of said second channel data with the number of the redelivering frequencies of said frequency conversion table; and
- a procedure for promoting the retrial when the number of the frequencies before the redelivery of said second channel data is not in agreement with the number of the redelivering frequencies of said frequency conversion table.

* * * * *